US010193994B2

(12) United States Patent
Lotfallah et al.

(10) Patent No.: US 10,193,994 B2
(45) Date of Patent: Jan. 29, 2019

(54) SIGNALING CACHED SEGMENTS FOR BROADCAST

(71) Applicant: QUALCOMM Incorporated, San Diego, CA (US)

(72) Inventors: Osama Abdel Latif Lotfallah, San Diego, CA (US); Carlos Marcelo Dias Pazos, Carlsbad, CA (US); Thomas Stockhammer, Bergen (DE); Nagaraju Naik, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 48 days.

(21) Appl. No.: 15/184,138

(22) Filed: Jun. 16, 2016

(65) Prior Publication Data

US 2016/0373546 A1 Dec. 22, 2016

Related U.S. Application Data

(60) Provisional application No. 62/183,615, filed on Jun. 23, 2015, provisional application No. 62/181,684, filed on Jun. 18, 2015.

(51) Int. Cl.
*H04L 29/08* (2006.01)
*H04L 29/06* (2006.01)
(Continued)

(52) U.S. Cl.
CPC ...... *H04L 67/2847* (2013.01); *H04L 65/1069* (2013.01); *H04L 65/4076* (2013.01);
(Continued)

(58) Field of Classification Search
CPC ........... H04N 21/4147; H04N 21/4334; H04N 7/17318; H04N 21/47202;
(Continued)

(56) References Cited

U.S. PATENT DOCUMENTS 5,719,786 A * 2/1998 Nelson .................. H04L 29/06
709/219
6,499,060 B1 * 12/2002 Wang .................. G10L 19/005
709/231

(Continued)

OTHER PUBLICATIONS

"3rd Generation Partnership Project; Technical Specification Group Services and System Aspects; Multimedia Broadcast/Multicast Service (MBMS) User service guidelines (Release 12)," 3GPP Draft; 26946-C20, V12.2.0; 3rd Generation Partnership Project (3GPP), Mobile Competence Centre ; 650, Route Des Lucioles; F-06921 Sophia-Antipolis Cedex; France vol. SA WG4 Mar. 18, 2015, Retrieved from the Internet: http://www.3gpp.org/ftp/tsg_sa/WG4_CODEC/Specs_update_after_SA67/; retrieved on Mar. 18, 2015, 49 pp.

(Continued)

*Primary Examiner* — Sargon N Nano
(74) *Attorney, Agent, or Firm* — Shumaker & Sieffert, P.A.

(57) ABSTRACT

An example client device includes a middleware unit for receiving media data either via a broadcast service or a unicast service, depending on whether the broadcast service is available. The client device also includes a streaming client, such as a Dynamic Adaptive Streaming over HTTP (DASH) client. The DASH client sends requests to retrieve media data via the middleware unit. The middleware unit may cache media data received via the broadcast service, such that even when the broadcast service is not active, if the streaming client requests media data that was previously received via the broadcast service, the middleware unit may provide the media data to the streaming client from the cache, rather than requesting the media data from an external server device specified in the request from the streaming client.

39 Claims, 30 Drawing Sheets

(51) Int. Cl.
| | |
|---|---|
| *H04N 21/2343* | (2011.01) |
| *H04N 21/433* | (2011.01) |
| *H04N 21/462* | (2011.01) |
| *H04N 21/61* | (2011.01) |
| *H04N 21/845* | (2011.01) |
| *H04W 4/06* | (2009.01) |

(52) U.S. Cl.
CPC .......... *H04L 65/4084* (2013.01); *H04L 67/02* (2013.01); *H04N 21/23439* (2013.01); *H04N 21/4331* (2013.01); *H04N 21/4622* (2013.01); *H04N 21/6125* (2013.01); *H04N 21/6131* (2013.01); *H04N 21/8456* (2013.01); *H04W 4/06* (2013.01)

(58) Field of Classification Search
CPC ......... H04N 21/47214; H04N 21/2747; H04N 21/2181; H04N 21/262; H04N 21/4263; H04N 21/4408; H04N 21/44222; H04L 12/2816; H04L 65/4084; Y10S 707/913
See application file for complete search history.

(56) References Cited

U.S. PATENT DOCUMENTS

| | | | | |
|---|---|---|---|---|
| 6,538,623 | B1* | 3/2003 | Parnian | G06F 1/163 |
| | | | | 224/908 |
| 6,640,145 | B2* | 10/2003 | Hoffberg | G05B 19/0426 |
| | | | | 700/17 |
| 6,813,690 | B1* | 11/2004 | Lango | G06F 12/0866 |
| | | | | 707/999.103 |
| 7,535,465 | B2* | 5/2009 | Morse | G11B 27/105 |
| | | | | 345/204 |
| 8,839,319 | B2* | 9/2014 | Harrar | H04N 5/782 |
| | | | | 725/115 |
| 2003/0115294 | A1* | 6/2003 | Hoang | H04N 7/163 |
| | | | | 709/219 |
| 2006/0095939 | A1* | 5/2006 | Jutzi | H04N 7/52 |
| | | | | 725/78 |
| 2013/0173737 | A1 | 7/2013 | Liu et al. | |
| 2013/0188705 | A1 | 7/2013 | Liu | |
| 2013/0191511 | A1 | 7/2013 | Liu et al. | |
| 2014/0199044 | A1* | 7/2014 | Gupta | H04L 67/10 |
| | | | | 386/239 |
| 2016/0380778 | A1* | 12/2016 | Shen | H04W 40/00 |
| | | | | 709/209 |

OTHER PUBLICATIONS

International Search Report and Written Opinion of International Application No. PCT/US2016/038108, dated Sep. 16, 2016, 14 pp.
Response to Written Opinion dated Sep. 16, 2016, from International Application No. PCT/US2016/038108, dated Dec. 16, 2016, 4 pp.
"Information Technology—Dynamic adaptive streaming over HTTP (DASH)—Part 5: Server and network assisted DASH (SAND)"; ISO/IEC CD 23009-5; ISO/IEC JTC 1/SC 29 N; ISO/IEC JTC 1/SC 29/WG 11; Secretariat; Feb. 19, 2012; 34 pp.
Stockhammer et al., "Further SAND refinements for eMBMS Operation"; International Organisation for Standardisation Organisation Internationale De Normalisation; ISO/IEC JTC1/SC29/WG11; Coding of Moving Pictures and Audio; MPEG2015/M36593; Warsaw, Poland, Jul. 2015, 12 pp.
Stockhammer et al., "Further SAND refinements for eMBMS Operation"; International Organisation for Standardisation Organisation Internationale De Normalisation; ISO/IEC JTC1/SC29/WG11; Coding of Moving Pictures and Audio; MPEG2015/M36593 (r2); Warsaw, Poland, Jul. 2015, 15 pp.
Fielding et al., "RFC 2616: Hypertext Transfer Protocol HTTP/1.1", Internet Citation, Network Working Group, Jun. 1999, Retrieved from the Internet: http://www.rfc-editor-org/ on Apr. 15, 2002; 165 pp.

Paila et al., "FLUTE—File Delivery over Unidirectional Transport," Network Working Group, RFC 6726, Internet Engineering Task Force (ITEF), Nov. 2012, Retrieved from the Internet: http://tools.ietf.org/html/rfc6726 on Feb. 10, 2017, 47 pp.
"3rd Generation Partnership Project; Technical Specification Group Services and System Aspects; Multimedia Broadcast/Multicast Service (MBMS) User service guidelines (Release 12)," 3GPP Draft; 26946-C20, V12.1.0; 3rd Generation Partnership Project (3GPP), Mobile Competence Centre; 650, Route Des Lucioles; F-06921 Sophia-Antipolis Cedex; France vol. SA WG4, Dec. 2014, Retrieved from the Internet: http://www.3gpp.org/ftp/tsg_sa/WG4_CODEC/Specs_update_after_SA67/; 48 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 211 pp.
ITU-T H.261, Line Transmission of Non-Telephone Signals, Video Codec for Audiovisual Services At p x 64 kbits, The International Telecommunication Union, Mar. 1993, 32 pp.
Chiu et al., "CE6a: Modified Down-sampling Filter for LM Mode of Intra Chroma Prediction," JCT-VC Meeting; 98, MPEG Meeting; Nov. 21-20, 2011; Geneva; Joint Collaborative Team on Video Coding of ISO/IEC JTC1/SC29/WG11 and ITU-T SG.16; Retrieved from: http://wftp3.itu.int/av-arch/jctvc-site/" No. JCTVC-G172, Nov. 9, 2011m XP030110156, 6 pp.
Francois et al., "Use of Chroma Phase in LM Mode," JCT-VC Meeting; Mpeg Meeting; Apr. 27-May 7, 2012; Geneva; Joint Collaborative Team on Video Coding of ISO/IEC JTC1/SC29/WG11 and ITU-T SG.16; Retrieved from: http://wftp3.itu.int/av-arch/jctvc-site/", No. JCTVC-I0188, Apr. 16, 2012, XP030111951, 8 pp.
Minezawa et al., "SCCE5 3.1.2: Extended Inter-component Prediction (JCTVC-Q0036)," JCT-VC Meeting; Jun. 30-Jul. 9, 2014; Sapporo; Joint Collaborative Team on Video Coding of ISO/IEC JTC1/SC29/WG11 and ITU-T SG.16; Retrieved from: http://wftp3.itu.int/av-arch/jctvc-site/" No. JCTVC-R0072, Jun. 20, 2014, XP030116317, 20 pp.
Chen et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, Mar. 16-23, 2011, 10 pp.
Chiu et al., "Cross-channel techniques to improve intra chroma prediction", Joint Collaborative Team on Video Coding (JCT-VC) of ITU-T SG16 WP3 and ISO/IEC JTC1/SC29/WG11, JCTVC-F502, 6th Meeting: Torino, IT, Jul. 14-22, 2011, 6 pp.
Wang et al., "High Efficiency Video Coding (HEVC) Defect Report" Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 312 pp.
Boyce et al., "Draft high efficiency video coding (HEVC) version 2, combined format range extensions (RExt), scalability (SHVC), and multi-view (MV-HEVC) extentions" Joint Collaborative Team on Video Coding (JCT-VC) of ITU-T SG 16 WP 3 and ISO/IEC JTC 1/SC 29/WG 11 14th Meeting: Vienna, AT, Jun. 30-Jul. 9, 2014, 545 pp.
Ford et al., "Colour space conversions," University of Westminster, London, Tech. Rep., Aug. 11, 1998, 31 pp.
Second Written Opinion of the International Searching Authority issued in International Application No. PCT/US2016/038108 dated May 10, 2017, 6 pp.

(56) References Cited

OTHER PUBLICATIONS

International Preliminary Report on Patentability from International Application No. PCT/US2016/038108, dated Aug. 11, 2017, 9 pp.

* cited by examiner

SIGNALING CACHED SEGMENTS FOR BROADCAST

This application claims the benefit of U.S. Provisional Application No. 62/181,684, filed Jun. 18, 2015, and U.S. Provisional Application No. 62/183,615, filed Jun. 23, 2015, the entire contents of each of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Video and, more generally, data may be delivered in a variety of transport methods. One such method is multimedia broadcast/multicast services (MBMS) or enhanced MBMS (eMBMS) in Third Generation Partnership Project (3GPP) networks. MBMS and eMBMS allow the delivery of services of interest to large numbers of subscribers using a single delivery pipe. In particular, server devices may transmit media data to client devices using, e.g., 3GPP, which may include broadcast or multicast delivery via MBMS or eMBMS. Additionally or alternatively, the server device may transmit media data using unicast, e.g., according to Hypertext Transport Protocol (HTTP) or Dynamic Adaptive Streaming over HTTP (DASH).

SUMMARY

In general, this application is directed to techniques related to switching between broadcast or multicast and unicast media data transmission techniques. In particular, such switching may occur based on whether or not a broadcast or multicast service is available, according to a geographical location of a client device. That is, the client device may be positioned in a particular service area, which may or may not provide a broadcast or multicast service for transmission of media data. When the broadcast or multicast service is available, the client device may receive media data using the broadcast or multicast service, whereas when the broadcast or multicast service is not available, the client device may receive the media data using unicast.

As media data is received, e.g., via broadcast or multicast, the client device caches the media data for subsequent retrieval by a target application, such as a DASH client (e.g., a web browser plug-in). At times, the client device may switch from broadcast or multicast to unicast, while media data that was previously received via broadcast or multicast is still cached. Thus, the techniques of this disclosure include determining whether or not such media data is cached following a switch from broadcast or multicast to unicast, and if so, determining whether to use the cached media data, rather than immediately retrieving similar media data via unicast.

In one example, a method of retrieving media data is performed by a middleware unit of a client device, where the middleware unit controls a hypertext transfer protocol (HTTP) proxy unit of the client device, and where the client device includes a local server unit. The method includes receiving a first set of media data of a media session via a broadcast service, determining that the broadcast service is no longer available after receiving the first set of media data, receiving a request to retrieve a second set of media data of the media session via a unicast service from a streaming application executed by the client device based on the determination that the broadcast service is no longer available, wherein the request specifies an address external to the client device, and in response to the request, when the second set of media data was previously received via the broadcast service, causing the HTTP proxy unit to redirect the request to the local server unit instead of the address external to the client device, wherein the second set of media data was previously received via the broadcast service.

In another example, a device for retrieving includes a hypertext transfer protocol (HTTP) proxy unit, a local server unit, and a middleware unit. The middleware unit controls the HTTP proxy unit, and the middleware unit is implemented by a hardware-based processing unit comprising logic circuitry. The middleware unit is configured to receive a first set of media data of a media session via a broadcast service, determine that the broadcast service is no longer available after receiving the first set of media data, receive a request to retrieve a second set of media data of the media session via a unicast service from a streaming application executed by the client device based on the determination that the broadcast service is no longer available, wherein the request specifies an address external to the client device, and in response to the request, when the second set of media data was previously received via the broadcast service, cause the HTTP proxy unit to redirect the request to the local server unit instead of the address external to the client device, wherein the second set of media data was previously received via the broadcast service.

In another example, a device for retrieving includes a hypertext transfer protocol (HTTP) proxy unit and a local server unit. The device further includes means for receiving a first set of media data of a media session via a broadcast service, means for determining that the broadcast service is no longer available after receiving the first set of media data, means for receiving a request to retrieve a second set of media data of the media session via a unicast service from a streaming application executed by the client device based on the determination that the broadcast service is no longer available, wherein the request specifies an address external to the client device, and means for causing, in response to the request, when the second set of media data was previously received via the broadcast service, the HTTP proxy unit to redirect the request to the local server unit instead of the address external to the client device, wherein the second set of media data was previously received via the broadcast service.

In another example, a computer-readable storage medium has stored thereon instructions that, when executed, cause a processor comprising a middleware unit of a client device, wherein the middleware unit controls a hypertext transfer protocol (HTTP) proxy unit of the client device, and wherein the client device includes a local server unit, to receive a first set of media data of a media session via a broadcast service, determine that the broadcast service is no longer available after receiving the first set of media data, receive a request to retrieve a second set of media data of the media session via a unicast service from a streaming application executed by the client device based on the determination that the broadcast service is no longer available, wherein the request specifies an address external to the client device, and in response to the request, when the second set of media data was previously received via the broadcast service, cause the HTTP proxy unit to redirect the request to the local server unit instead of the address external to the client device, wherein the second set of media data was previously received via the broadcast service.

The details of one or more examples are set forth in the accompanying drawings and the description below. Other features, objects, and advantages will be apparent from the description and drawings, and from the claims.

DETAILED DESCRIPTION

Figure 1:
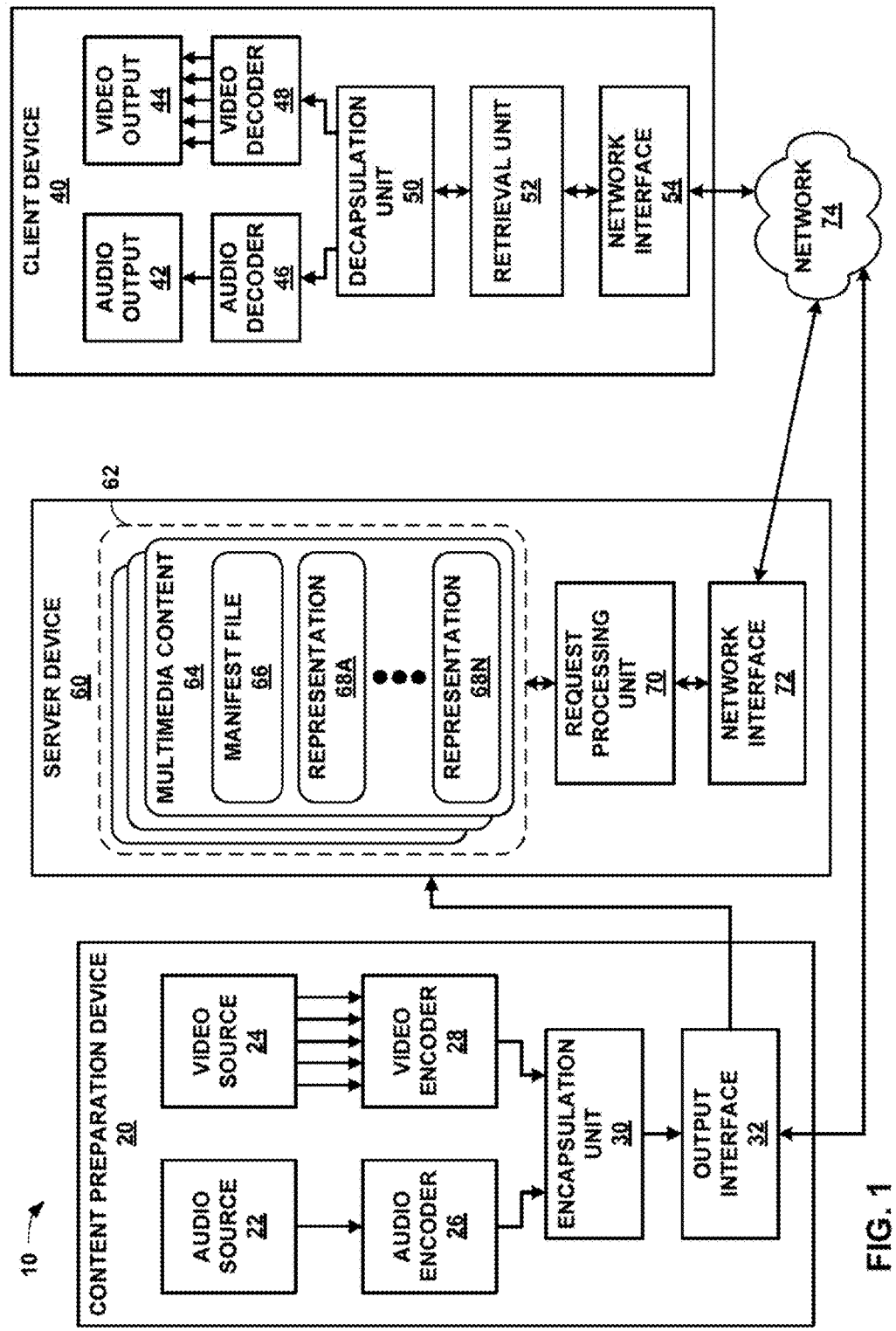
FIG. 1 is a block diagram illustrating an example system that implements techniques for streaming media data over a network.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time. Of course, audio and video data need not necessarily be captured at the same time, such as if audio data is dubbed for another language, or if sound effects or voiceovers are added after video data has been captured.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast service/protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the manifest file 66 (e.g., an MPD) of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as MBMS, eMBMS, or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

In accordance with the techniques of this disclosure, retrieval unit 52 may retrieve/receive media data according to either a broadcast or multicast service or a unicast service, depending on whether or not the broadcast/multicast service is available. In particular, retrieval unit 52 may switch between the broadcast/multicast service and the unicast service as the broadcast/multicast service becomes available or unavailable. Moreover, at times, data received via the broadcast/multicast service may be cached and remain cached after the broadcast/multicast service becomes unavailable. Accordingly, retrieval unit 52 may use the cached data received via the broadcast/multicast service before or while receiving media data via the unicast service.

For example, retrieval unit 52 may include a memory that implements a cache for media data. Retrieval unit 52 may also include a broadcast/multicast unit, a proxy unit, a local server, and a streaming client, such as a DASH client. As the broadcast/multicast unit receives data via broadcast or multicast, the broadcast/multicast unit may cache the data in the cache of the memory. Subsequently, the broadcast/multicast service may become unavailable, e.g., because client device 40 has physically been moved to a geographic area in which the broadcast/multicast service is not available (e.g., not provided by server device 60).

In general, the streaming client may send HTTP GET or partial GET requests to either a local server or an external server, but a proxy unit may intercept the requests. The proxy unit may be configured to either redirect the requests to the local server, when the requested media data is available locally (e.g., in the cache), or to an external server (e.g., server device 60), when the requested media data is not available locally. Thus, rather than immediately transferring to a unicast service, retrieval unit 52 may cause the proxy unit to redirect requests for media data to the local server to deliver the media data from the cache that was previously received via the broadcast/multicast service. Retrieval unit 52 may retrieve subsequent media data via unicast at a switch point (e.g., an instantaneous decoder refresh (IDR) picture of video data) and cache this data such that the data is available at or before a time at which the cached media data received via the broadcast/multicast service is fully consumed.

A manifest file may indicate an IP address from which media data is available. When the broadcast/multicast service is available, the IP address may correspond to the local server, whereas when the broadcast/multicast service is not available, the IP address may correspond to an external server device, such as server device 60. In general, the streaming client (e.g., DASH client) may be configured to direct requests for media data to the advertised IP address. However, the proxy unit of retrieval unit 52 may intercept the requests and determine whether the requested media data is in fact available from the local server, e.g., when the media data was previously received via the broadcast/multicast service.

That is, the streaming client may direct HTTP GET or partial GET requests to an IP address of server device 60, based on the manifest file indicating the IP address of server device 60. However, despite the broadcast/multicast service not being available in certain circumstances, when the requested media data received via the broadcast/multicast service is available in the cache from the local server, the proxy unit may redirect the requests to the local server (e.g., a localhost address of client device 40). For example, the proxy unit may respond to an HTTP GET or partial GET with an HTTP 3xx type response (e.g., an HTTP 300 response), which may specify an IP address of the local server (e.g., a localhost address of client device 40). In this manner, the proxy unit may cause the client device to retrieve media data from the local server, even when a broadcast/multicast service, by which media data provided by the local server receives the media data, is not available.

In some examples, a manifest file for the media data may indicate that multiple representations are available, where at least one of the representations corresponds to a representation available via the broadcast/multicast service, and at least one other of the representations corresponds to a representation available via the unicast service. The proxy unit may send a Server and Network assisted DASH (SAND) enforcement message to the streaming client to cause the streaming client to retrieve media data from an appropriate one of the representations. For example, if the broadcast/multicast service is available, the SAND enforcement message may include instructions or configuration data that cause the streaming client to retrieve media data of the representation corresponding to the broadcast/multicast service. Likewise, if the broadcast/multicast service is not available but media data previously received via the broadcast/multicast service is available, the SAND enforcement message may include instructions or configuration data that cause the streaming client to retrieve media data of the representation corresponding to the broadcast/multicast service.

On the other hand, if the broadcast/multicast service is not available (and if media data previously received via the broadcast/multicast service is not available), the SAND enforcement message may include instructions or configuration data that cause the streaming client to retrieve media data of the representation corresponding to the unicast service.

Such instructions/configuration data of the SAND enforcement message may include, for example, a base URL field including a URI prefix that identifies the appropriate representation and one or more status fields that represent statuses of associated resources (e.g., representations and/or segments of the representations). The SAND enforcement message may include an HTTP 300 response to an HTTP GET request from the streaming client, where the HTTP 300 response includes, e.g., an identifier of one of the representations associated with the broadcast/multicast service.

As noted above, client device 40 may be geographically moved between service areas, where in some service areas, the broadcast/multicast service is available, and in other service areas, the broadcast/multicast service is not available. Thus, of course, retrieval unit 52 may, after moving to a service area in which the broadcast/multicast service is not available, retrieve media data using the unicast service. Likewise, retrieval unit 52 may subsequently move back to a service area in which the broadcast/multicast service is available, and again receive media data via the broadcast/multicast service.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
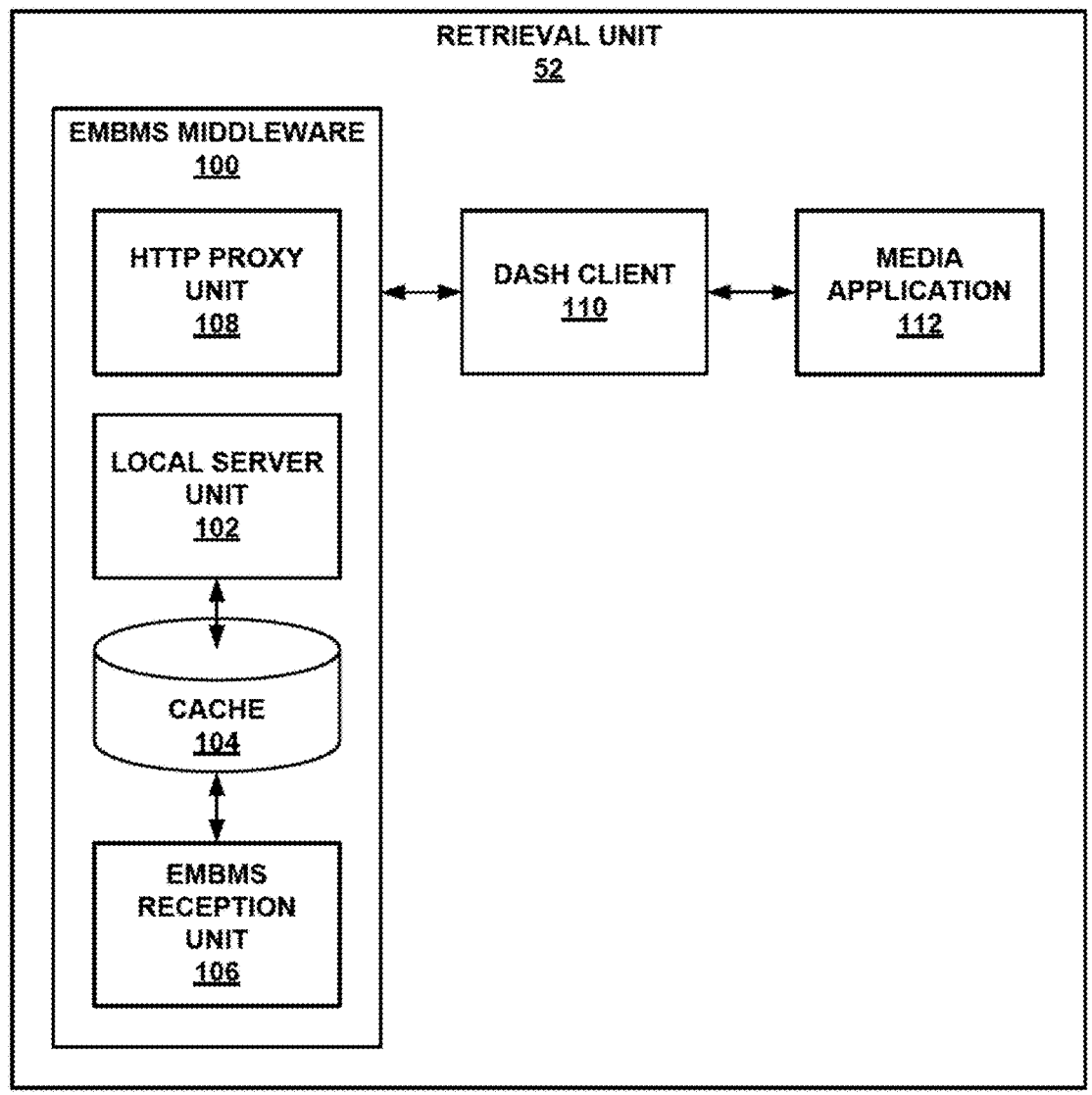
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, local server unit 102, and HTTP proxy unit 108. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Furthermore, in accordance with the techniques of this disclosure, HTTP proxy unit 108 may act as a proxy for DASH client 110. For example, in accordance with these techniques, HTTP proxy unit 108 may intercept requests for data from DASH client 110. When in a broadcast reception mode, eMBMS reception unit 106 receives DASH segments via broadcast and stores the DASH segments to cache 104. In unicast retrieval mode, DASH client 110 may submit requests to retrieve DASH segments from a content delivery network (CDN) (not shown), separate from a client device (e.g., client device 40) that includes retrieval unit 52. However, HTTP proxy unit 108 may intercept these requests and determine whether the requested segments were previously received during a broadcast reception mode, and if so, redirect the requests to local server unit 102.

For example, HTTP proxy unit 108 may send an HTTP 300 response to DASH client 110, including a localhost address associated with local server unit 102, to cause DASH client 110 to retrieve the requested segment from local server unit 102. On the other hand, if the segments are not cached in cache 104, HTTP proxy unit 108 may forward the request to the CDN. Additional details of these techniques are described in greater detail below.

Figure 3:
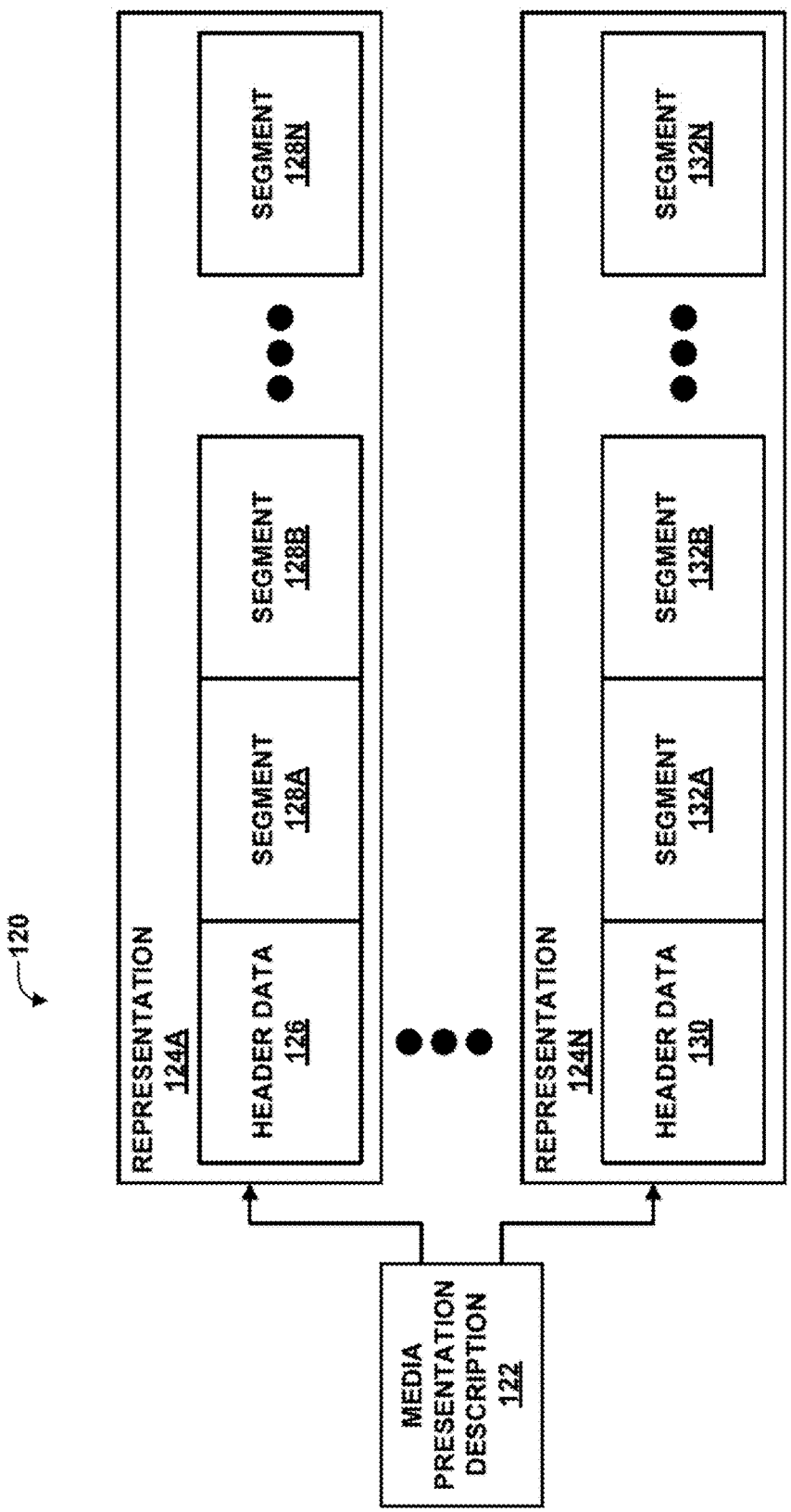
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include data as shown below, e.g., in FIGS. 8, 12, 17, 23, and/or 27.

Figure 4:
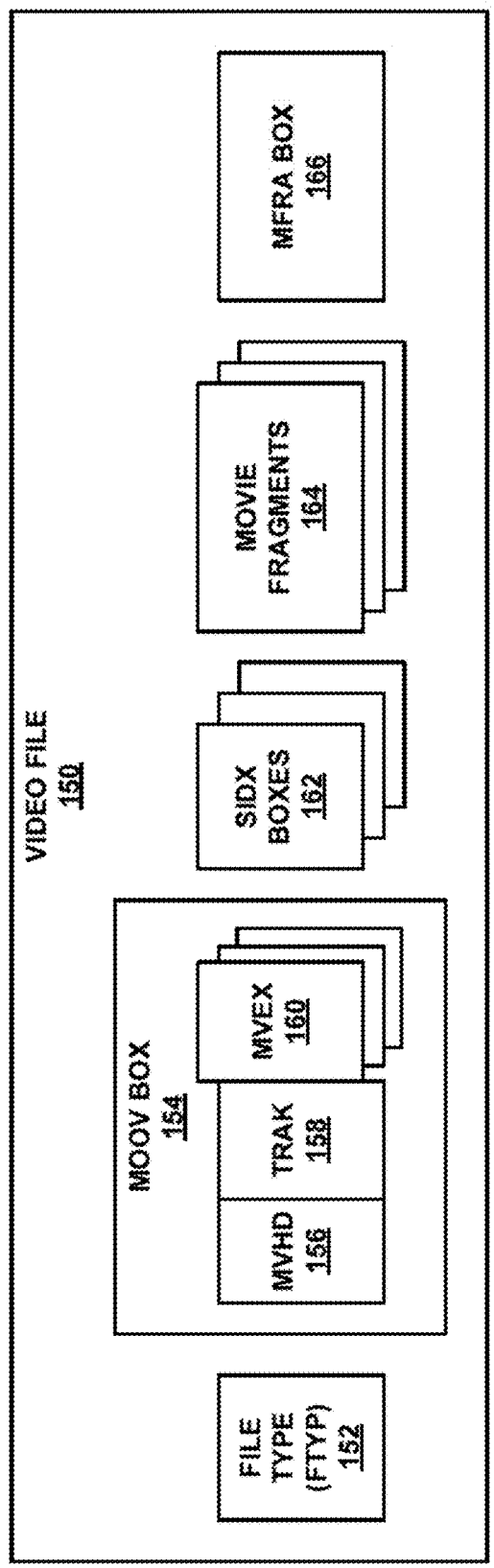
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
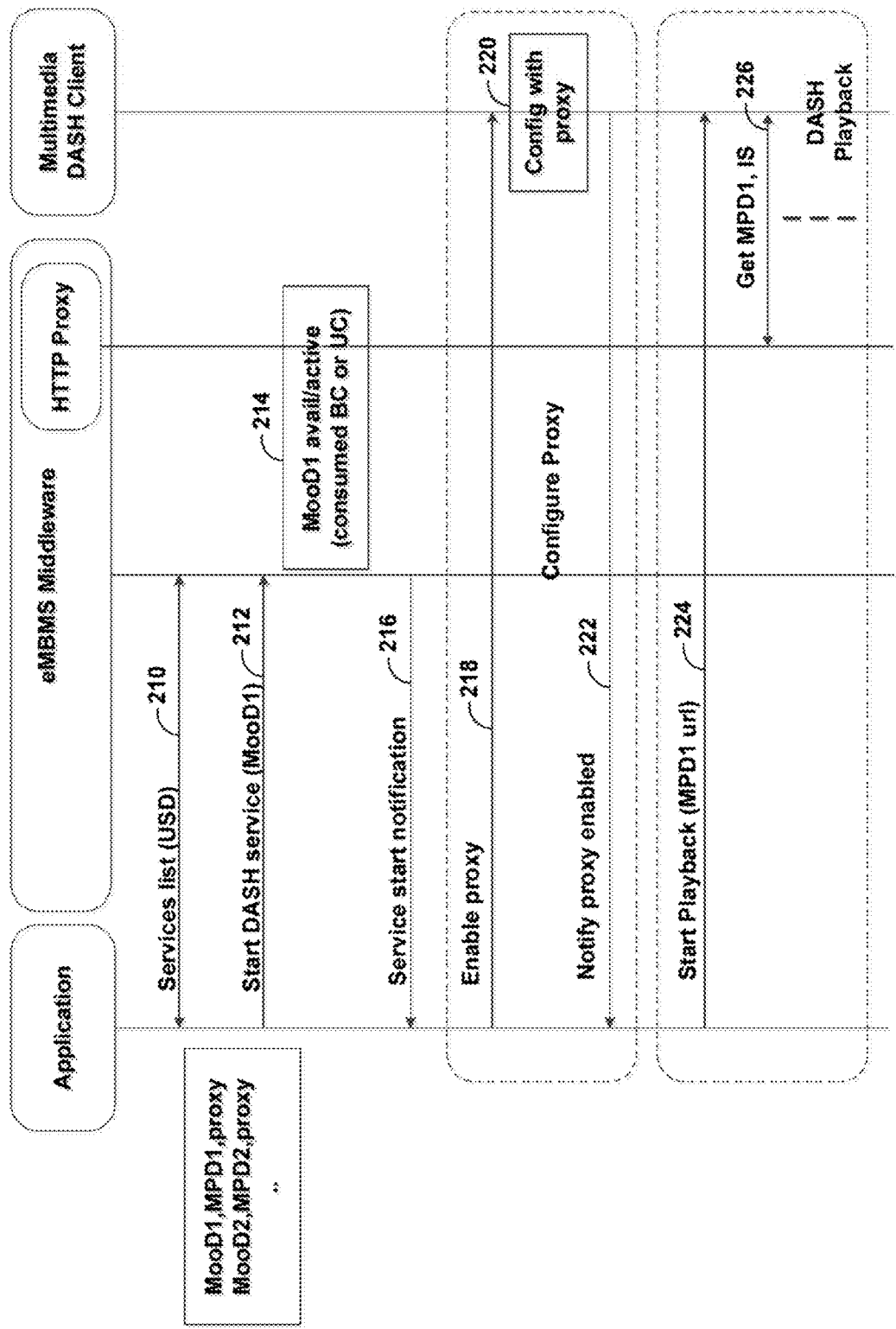
FIG. 7 is a conceptual diagram illustrating an example technique in accordance with the techniques of this disclosure in which DASH HTTP requests are directed to an HTTP proxy.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box (not shown) that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box (not shown) that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include (1) playback times at which sub-segments begin and/or end, (2) byte offsets for the sub-segments, (3) whether the sub-segments include (e.g., start with) a stream access point (SAP), (4) a type for the SAP (e.g., whether the SAP is an instantaneous decoder refresh (IDR) picture, a clean random access (CRA) picture, a broken link access (BLA) picture, or the like), (5) a position of the SAP (in terms of playback time and/or byte offset) in the sub-segment, (6) and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
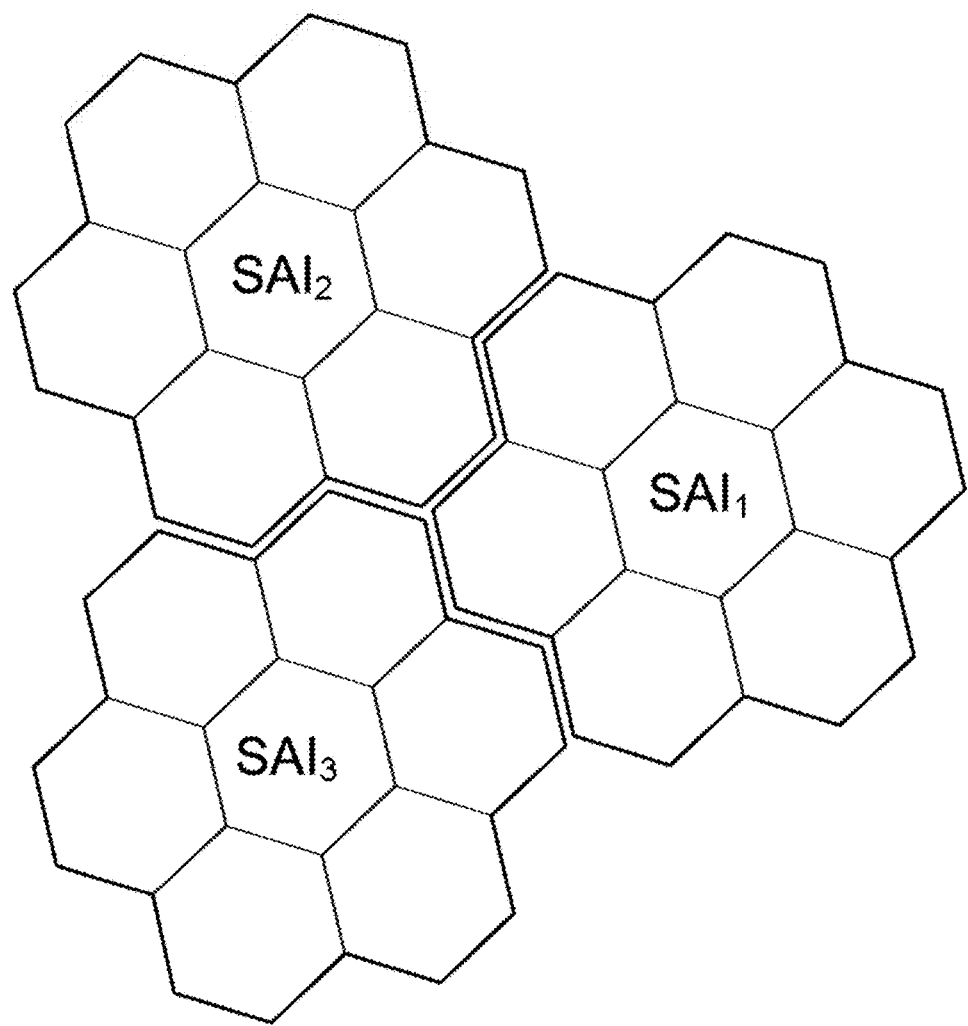
FIG. 5 is a conceptual diagram illustrating various service areas of, e.g., a radio access network (RAN).

FIG. 5 is a conceptual diagram illustrating various service areas of, e.g., a radio access network (RAN). Some or all of the service areas may provide an MBMS operation on Demand (MooD) service, e.g., in accordance with "3rd Generation Partnership Project; Technical Specification Group Services and System Aspects; Multimedia Broadcast/Multicast Service (MBMS) improvements; MBMS operation on demand (Release 12)" 3GPP TR 26.849 version 12.0.0, Dec. 12, 2014, available at www.3gpp.org/DynaReport/26849.htm. A client device, such as client device 40 (FIG. 1), may move among service areas, identified here by service area identifiers (SAIs): SAI1, SAI2, and SAI3, or other service areas. Because some service areas may offer the MooD service, while others do not, the client device may be configured to either receive data via broadcast (e.g., eMBMS) or to retrieve media data using unicast. In particular, client device 40 may receive media data via the MooD service in service areas in which the MooD service is offered, and retrieve media data via a unicast service in service areas in which the MooD service is not offered.

One use case in accordance with the techniques of this disclosure is directed to when a network operator plans to offer MooD service in service areas: SAI1, SAI2 and SAI3 (venue vicinity, parking lot, etc.) The service may be fully described in the user service description (USD), thus no USD updates are needed to signal changes in coverage. The USD may describe, for example, service area information for planned coverage, a temporary mobile group identity (TMGI) for the service, and a single MPD may describe all broadcast and/or unicast representations.

In this example, TMGI activation for a MooD service may include the following. The network may initially activate the TMGI in SAI1. For user equipment (UEs) (that is, client devices such as client device 40) located in SAI2, the TMGI is not active. Client device 40 may initially start consuming service using unicast. Based on unicast load (via consumption reports), the network may subsequently activate TMGI in SAI2. Client device 40 may then switch to broadcast when the TMGI is active in its current service area (e.g., SAI2).

Figure 6:
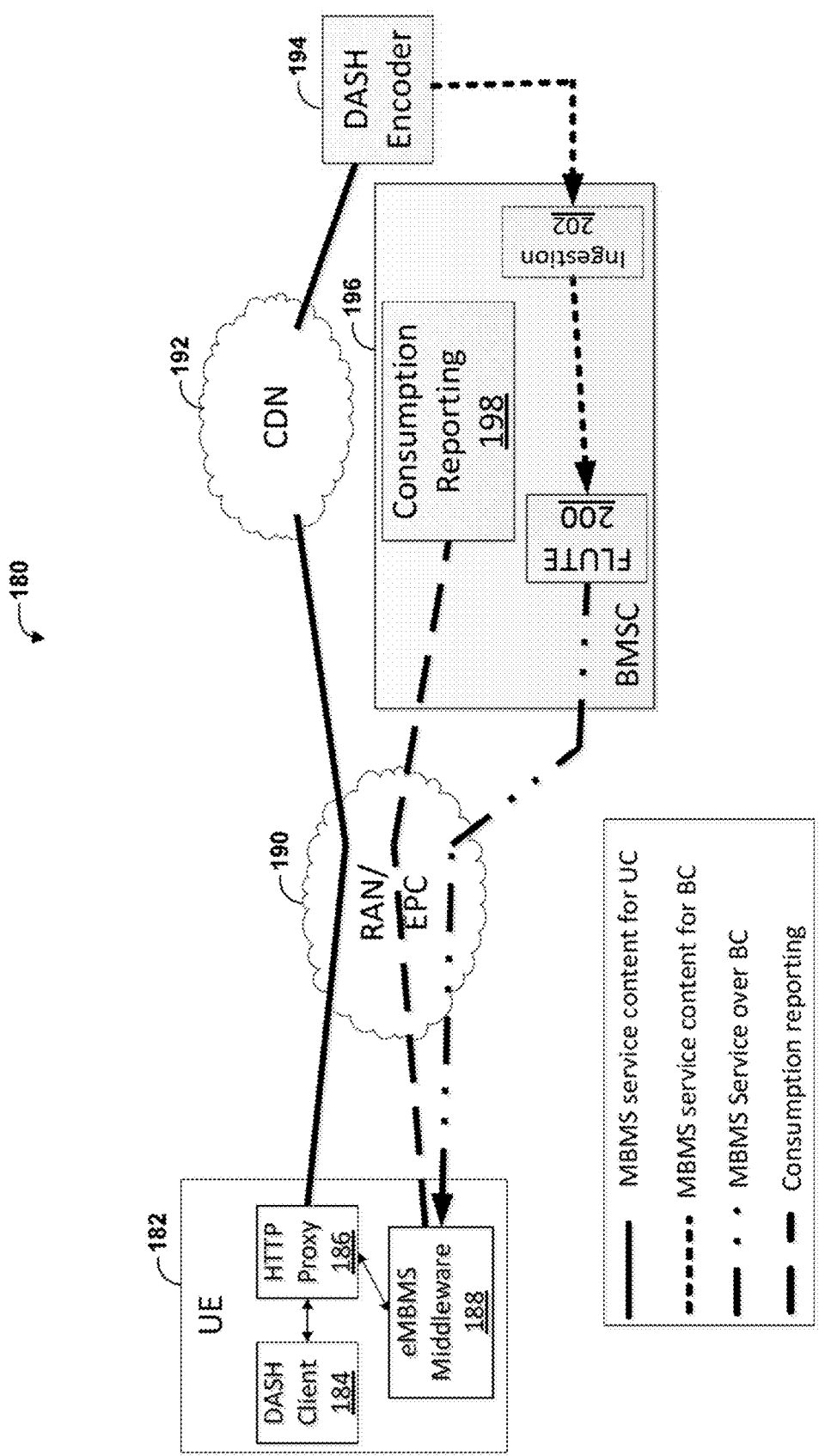
FIG. 6 is a conceptual diagram illustrating end-to-end architecture for MooD service in accordance with the techniques of this disclosure.

FIG. 6 is a conceptual diagram illustrating end-to-end architecture 180 for MooD service in accordance with the techniques of this disclosure. In this example, architecture 180 includes user equipment (UE) 182, radio area network/evolved packet core (RAN/EPC) 190, content delivery network (CDN) 192, DASH encoder 194, and broadcast multicast service center (BMSC) 196. UE 182 may correspond to client device 40 of FIG. 1. DASH encoder 194 may correspond to the elements of content preparation device 20 of FIG. 1.

DASH encoder 194 may make segments available via CDN 192, which may provide the segments via unicast (UC) and via BMSC 196, which provides a broadcast or multicast service such as MBMS or eMBMS.

UE 182 includes DASH client 184, HTTP proxy 186, and eMBMS middleware unit 188. HTTP proxy 186 intercepts HTTP GET requests from DASH client 184 and redirects them to CDN 192 or middleware unit 188, in this example. DASH client 184 is agnostic with respect to whether segments are delivered via unicast or broadcast to UE 182.

BMSC 196 includes consumption reporting unit 198, FLUTE unit 200, and ingestion interface 202. In general, BMSC 196 receives media data from DASH encoder 194 via ingestion interface 202, and sends the media data according to FLUTE protocol via FLUTE unit 200.

In this example, UE 182 sends consumption reports to consumption reporting unit 198 shown in BMSC 196. UE 182 reports starts and stops of media data playback, as well as periodic consumption reports when consuming media data according to a service, e.g., a broadcast or multicast service. BMSC 196 counts UEs consuming DASH content via unicast when broadcast is not available. When unicast load exceeds some threshold, BMSC 196 may enable broadcast delivery. BMSC 196 counts UEs consuming DASH content via broadcast once the broadcast service is available. When the number of UEs consuming media data via the broadcast service is below some threshold, BMSC 196 may disable broadcast delivery.

FIG. 7 is a conceptual diagram illustrating an example method in accordance with the techniques of this disclosure in which DASH HTTP requests are directed to an HTTP proxy. The method of FIG. 7 is explained with respect to the example components of FIG. 2. However, it should be understood that other devices may be configured to perform the method of FIG. 7 as well, such as UE 182 of FIG. 6. In general, in this example method, HTTP proxy unit 108 is configured to intercept DASH requests from DASH client 110 and forward these requests to a local host (e.g., local server unit 102) or to an outside unicast server.

In this example, eMBMS middleware unit 100 includes HTTP proxy information for services that need to use HTTP proxy unit 108. An application interface to eMBMS middleware unit 100 includes proxy information. Media application 112 may configure a media player interface (used by DASH client 110) to use HTTP proxy unit 108.

Initially, media application 112 retrieves a services list (e.g., a user service description (USD)) from eMBMS middleware unit 100 (210). Media application 112 then sends an instruction to start a DASH service (e.g., MooD) (212). eMBMS middleware unit 100 determines whether the MooD service is available and active (214), to determine whether to consume media data using broadcast or multicast, or unicast. In either case, in this example, eMBMS middleware unit 100 sends a service start notification (216) to media application 112.

Media application 112 in this example enables HTTP proxy unit 108 (218), configuring DASH client 110 to use HTTP proxy unit 108 (220). DASH client 110 responds to media application 112 once the configuration to use HTTP proxy unit 108 is enabled (222). Media application 112 then sends an instruction to start playback, e.g., corresponding to a URL advertised in an MPD, to DASH client 110 (224). DASH client 110 in turn sends an HTTP GET request to obtain media data available from the URL to HTTP proxy unit 108 (226). HTTP proxy unit 108, in turn, either retrieves the requested media data from local server unit 102 or from a CDN using unicast. In either case, HTTP proxy unit 108 delivers the media data to DASH client 110, which returns the media data to media application 112.

Figure 8:
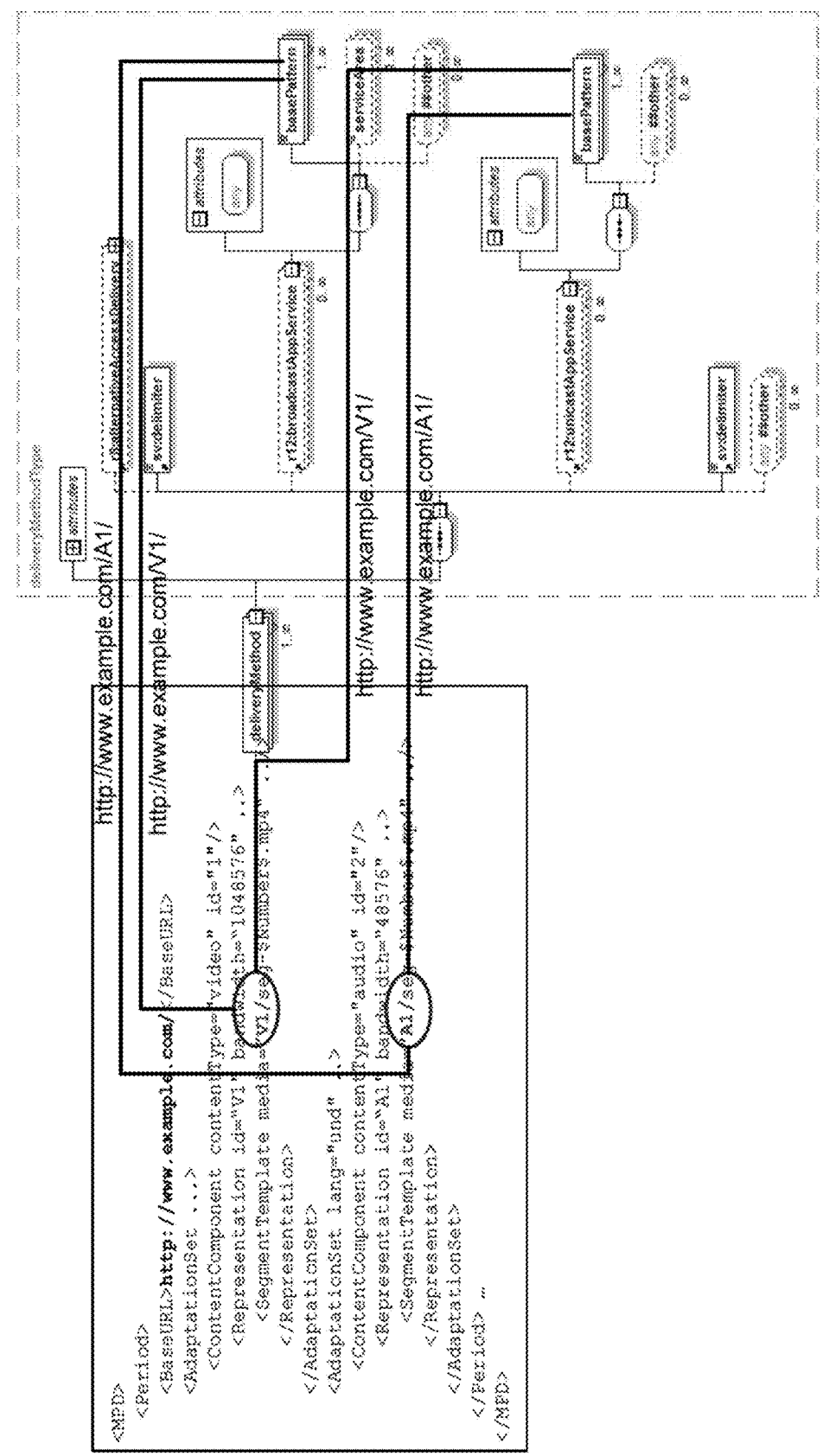
FIG. 8 is a conceptual diagram illustrating an example media presentation description (MPD) with a single representation per media type (e.g., video and audio).

FIG. 8 is a conceptual diagram illustrating an example media presentation description (MPD) with a single representation per media type (e.g., video and audio). In Rel 12, user service description (USD) elements are under deliveryMethod. The USD elements may describe broadcast representations via r12:broadcastAppService and unicast representations via r12:unicastAppService.

In this example, the MPD contains single representations per media component (e.g., audio and video). Likewise, MPD@timeShiftBufferDepth has a value that is greater than zero (0). In the example of FIG. 8, video data (represented as "V1") and audio data (represented as "A1") can be specified in the basePattern element of the r12:broadcastAppService and in the basePattern element of the r12:unicastAppService of the deliveryMethodType element.

Figure 9:
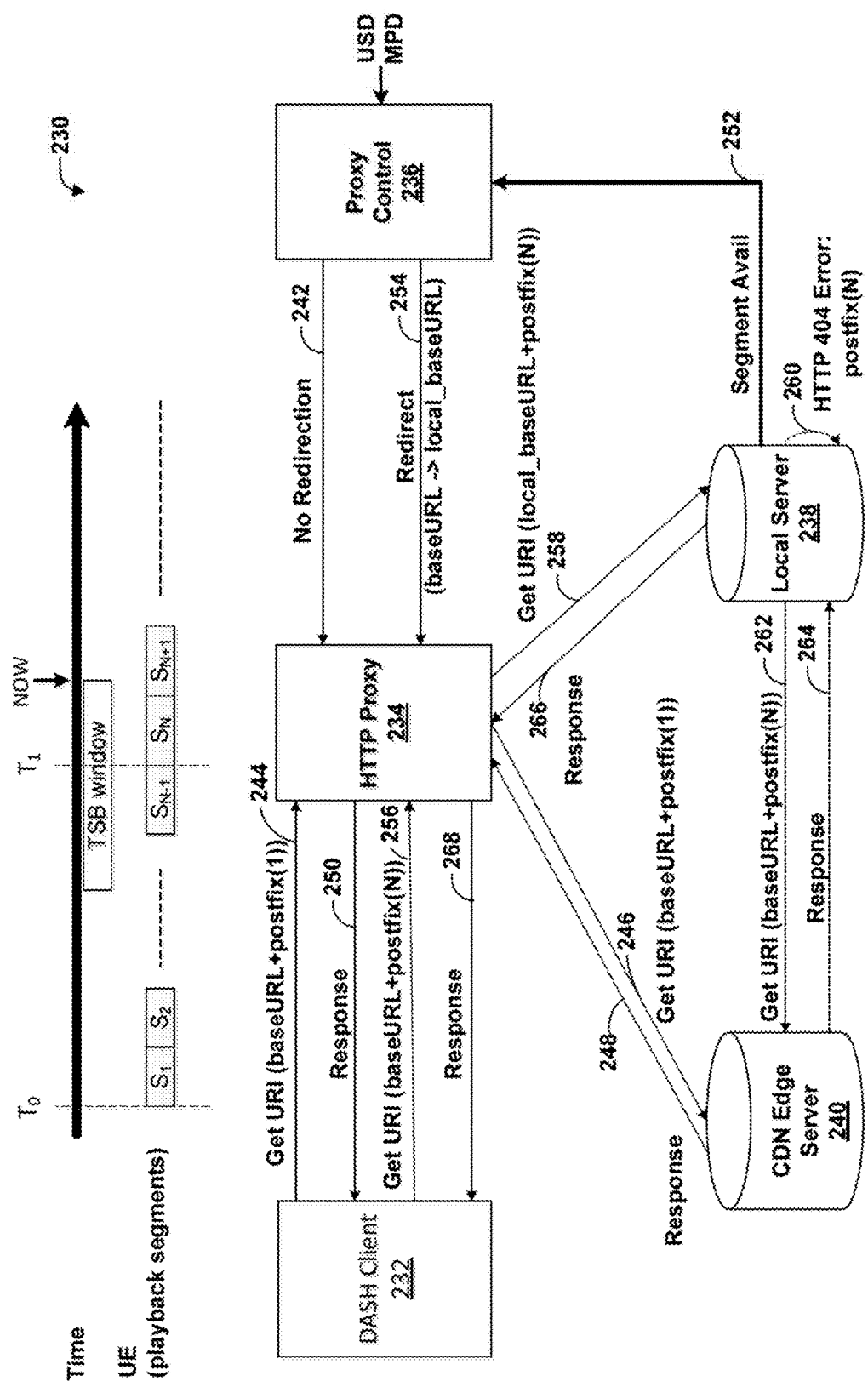
FIG. 9 is a conceptual diagram illustrating an example technique for configuring the HTTP proxy unit to direct a DASH client during a switch from unicast to broadcast.

FIG. 9 is a conceptual diagram illustrating an example technique for configuring the HTTP proxy unit to direct a DASH client during a switch from unicast to broadcast. FIG. 9 illustrates system 230 including various components that generally correspond to similar components of FIGS. 1, 2, and 6. In particular, system 230 includes DASH client 232 (which may correspond to DASH client 110 of FIG. 2 or DASH client 184 of FIG. 6), HTTP proxy unit 234 (which may correspond to HTTP proxy unit 108 of FIG. 2 or HTTP proxy unit 186 of FIG. 6), proxy control unit 236 (which may form part of the HTTP proxy itself or be a separate control unit), local server 238 (which may correspond to local server unit 102 of FIG. 2 or eMBMS middleware unit 188 of FIG. 6), and CDN edge server 240 (which may correspond to server device 60 of FIG. 1 or a server of CDN 192 of FIG. 6).

FIG. 9 also illustrates a timeline at the top of the figure, and actions performed at various times during the timeline. At time<$T_1$, HTTP proxy 234 fetches segments using unicast, and proxy control unit 236 uses information from USD and MPD to configure redirection rules. In particular, prior to time T₁, it is assumed that eMBMS is disabled. Therefore, proxy control unit 236 configures HTTP proxy unit 234 to perform no redirection (242). Thus, when DASH client 232 submits an HTTP GET request specifying a particular URI (244), HTTP proxy unit 234 forwards the request to CDN edge server 240 (246). CDN edge server 240 responds by delivering the requested media data to HTTP proxy unit 234 (248), which forwards the media data to DASH client 232 (250).

When eMBMS is enabled, the BM-SC will broadcast live edge segments. At time=T₁, eMBMS is enabled, and therefore, proxy control unit 236 receives an indication from local server 238 that a segment is available (252). In response, proxy control unit 236 configures HTTP proxy unit 234 to redirect requests for media data to local server unit 238 (e.g., specifying a localhost address of a client device including DASH client 232 and HTTP proxy 234) (254). Following time T₁, broadcast segment S_N is available and redirecting to local server is enabled. Accordingly, when DASH client 232 sends an HTTP GET request specifying a URI of segment SN to HTTP proxy unit 234 (256), HTTP proxy unit 234 redirects the request to local server 238 (258). If the requested segment is available, local server 238 will deliver the segment to HTTP proxy unit 234 (266), and HTTP proxy unit 234 forwards the segment to DASH client 232 (268).

The DASH client might request non live edge segments (within a time shift buffer (TSB) window). Thus, local server unit 238 may determine that the requested segment is not available, triggering an HTTP 404 error (260). Such HTTP 404 errors may be handled in the local server using unicast fetches (e.g., from the CDN edge server). That is, local server 238 may request the segment from CDN edge server 240 (262), which may send the requested segment to local server 238 (264). Local server 238 may then proceed to send the segment to HTTP proxy unit 234 as discussed above.

Figure 10:
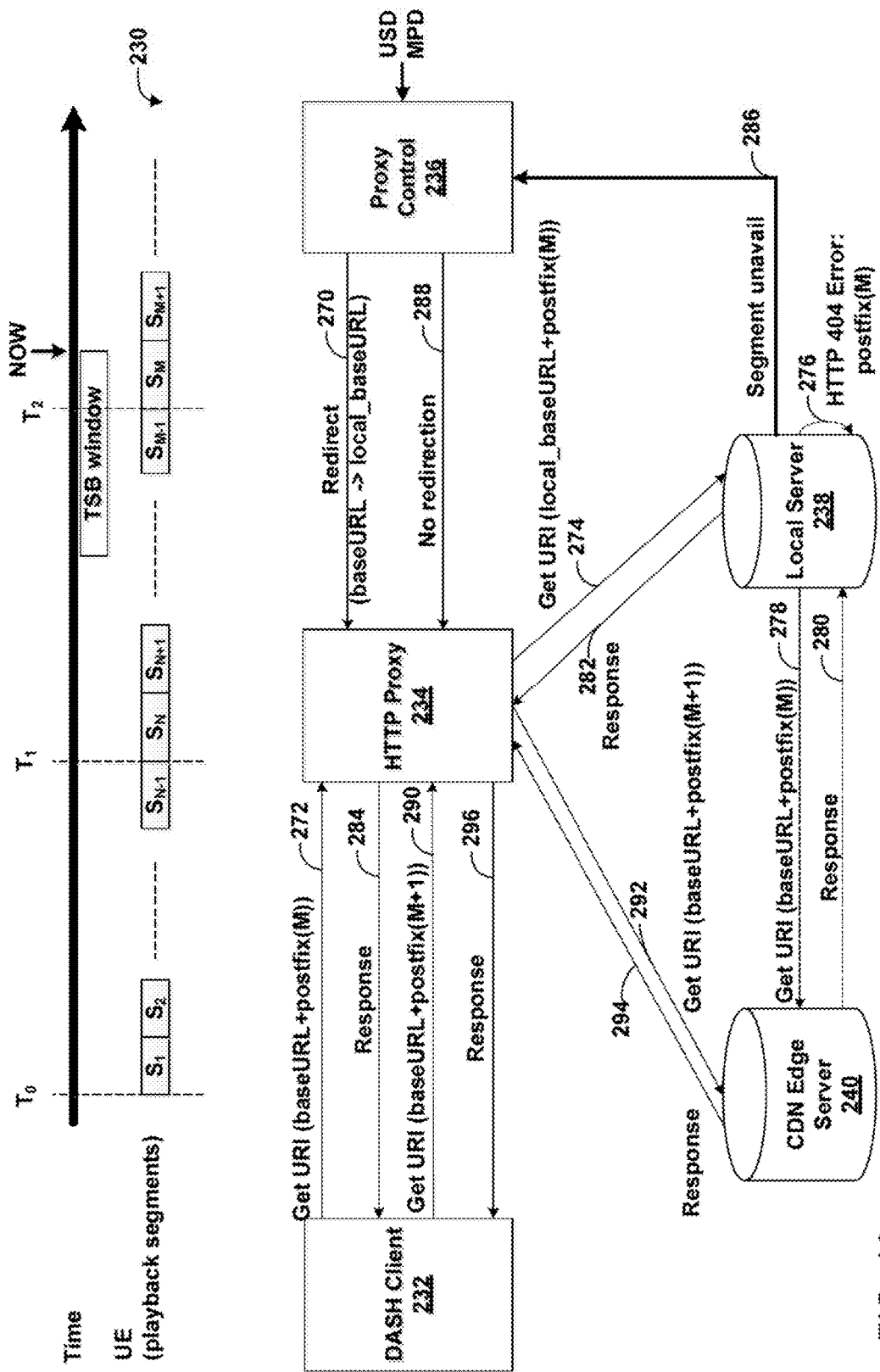
FIG. 10 is a conceptual diagram illustrating an example technique for configuring the HTTP proxy unit to direct the DASH client during a switch from broadcast to unicast.

FIG. 10 is a conceptual diagram illustrating an example technique for configuring HTTP proxy unit 234 to direct DASH client 232 during a switch from broadcast to unicast. This example may be continuous with the example of FIG. 9. That is, the timelines in FIGS. 9 and 10 are the same. However, it should be understood that a previous and/or subsequent switch from unicast to broadcast may also be made, e.g., as discussed above with respect to FIG. 9.

In this example, prior to time T₂, a broadcast service is available. Thus, the components of system 230 may operate as discussed above with respect to FIG. 9. That is, when the broadcast service is available, proxy control unit 236 configures HTTP proxy unit 234 to redirect requests for media data to local server unit 238 (e.g., specifying a localhost address of a client device including DASH client 232 and HTTP proxy 234) (270). Accordingly, when DASH client 232 sends an HTTP GET request specifying a URI of a segment to HTTP proxy unit 234 (272), HTTP proxy unit 234 redirects the request to local server 238 (274). If the requested segment is available, local server 238 will deliver the segment to HTTP proxy unit 234 (282), and HTTP proxy unit 234 forwards the segment to DASH client 232 (284). If the requested segment is not available, local server 238 may further request the segment from CDN edge server 240 (278), which may deliver the requested segment to local server 238 (280).

In this example, at time=T₂, the broadcast service is no longer available. Thus, local server 238 may send data indicating that segments are no longer available to proxy control unit 236 (286), e.g., an indication of the last received segment. In response, proxy control unit 236 may configure HTTP proxy unit 234 to use unicast to satisfy subsequent segment requests (286). Then HTTP proxy unit 234 stops redirecting to local server 238. Conventionally, this would mean that if DASH client 232 were to request a segment within the TSB window (e.g., segment $S_{M-2}$) (290), HTTP proxy unit 234 would forward the request to CDN edge server 240, which would deliver the segment to HTTP proxy unit 234 (294), which would forward the segment to DASH client 232 (296). However, one or more segments might be available locally, but may not be deliverable. The issue is that this is less efficient utilization of locally cached segments after the transition to unicast. In accordance with the techniques of this disclosure, as discussed in greater detail below, system 230 may be configured to use cached segments of local server unit 238 more efficiently than conventional techniques.

Figure 11:
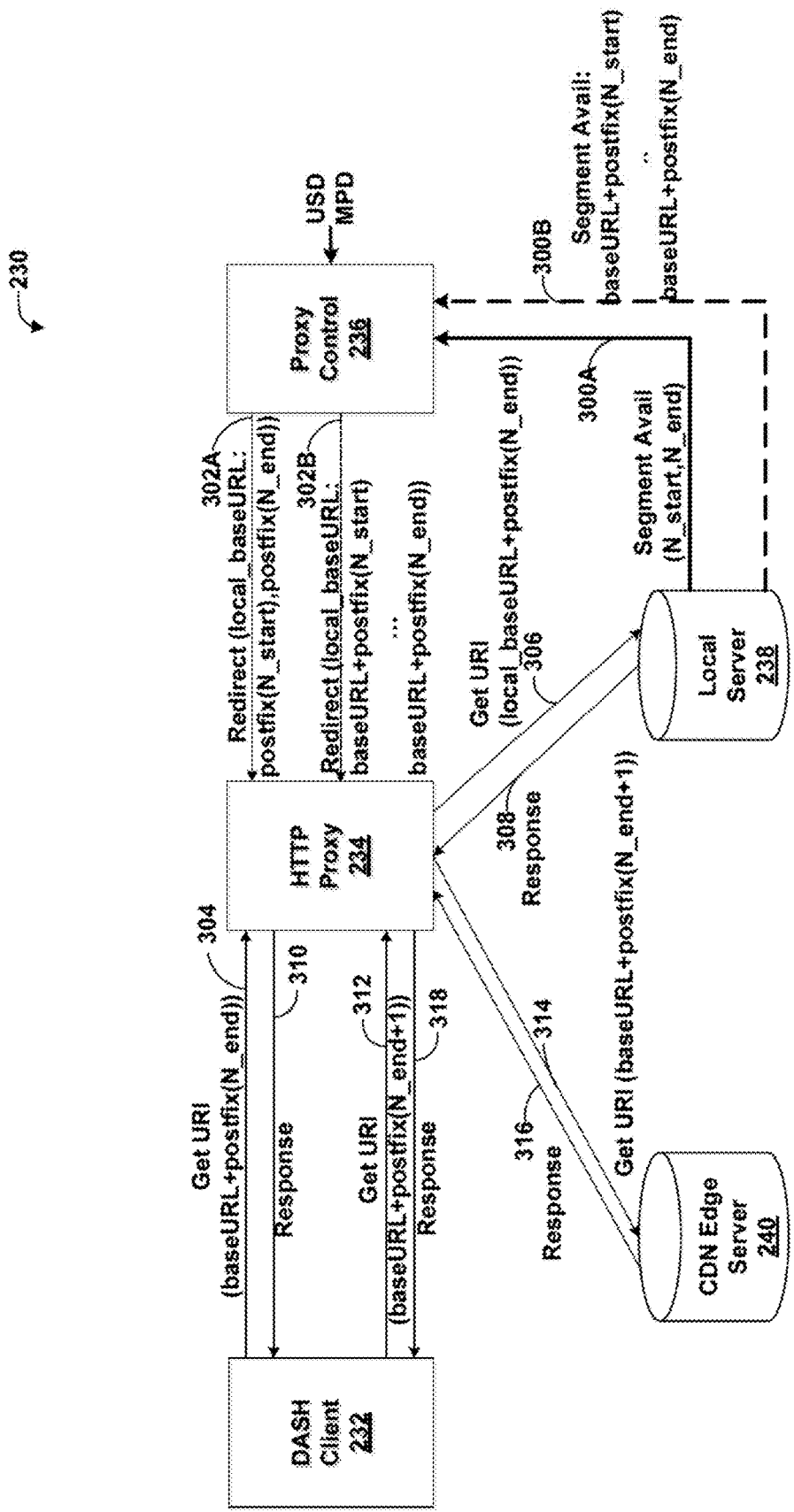
FIG. 11 is a conceptual diagram illustrating an example configuration for the HTTP proxy during a switch from broadcast to unicast in accordance with the techniques of this disclosure.

FIG. 11 is a conceptual diagram illustrating an example configuration for HTTP proxy unit 234 during a switch from broadcast to unicast in accordance with the techniques of this disclosure. In general, proxy control unit 236 configures HTTP proxy unit 234 to direct requests for segment URLs with segment numbers between [N_start, N_end] to local server unit 238, and provides a list of segment URLs that can be satisfied from local server unit 238. In this example, N_start represents the segment number of the oldest segment cached in local server, while N_end represents the segment number of the latest segment cached in local server. When local server unit 238 removes cached segments, proxy control unit 236 updates redirection rules.

In particular, in this example, local server unit 238 sends a list of available segments to proxy control unit 236, e.g., in the form of an initial list (300A) and periodic updates to the list (300B). Proxy control unit 236 therefore configures HTTP proxy unit 234 with redirection rules (302A, 302B) that cause HTTP proxy 234 to redirect requests for the particular segments that are available from local server 238 to local server 238. Thus, when DASH client 232 sends a request for one of the segments in the list of segments available from local server unit 238 (304), HTTP proxy unit 234 redirects the request to local server unit 238 (306), which responds by delivering the requested segment to HTTP proxy unit 234 (308). On the other hand, when DASH client 232 requests a segment that is not in the list of available segments (312), HTTP proxy unit 234 forwards the request to CDN edge server 240 (314), which delivers the requested segment to HTTP proxy unit 234 (316), which forwards the segment to DASH client 232 (318).

Figure 12:
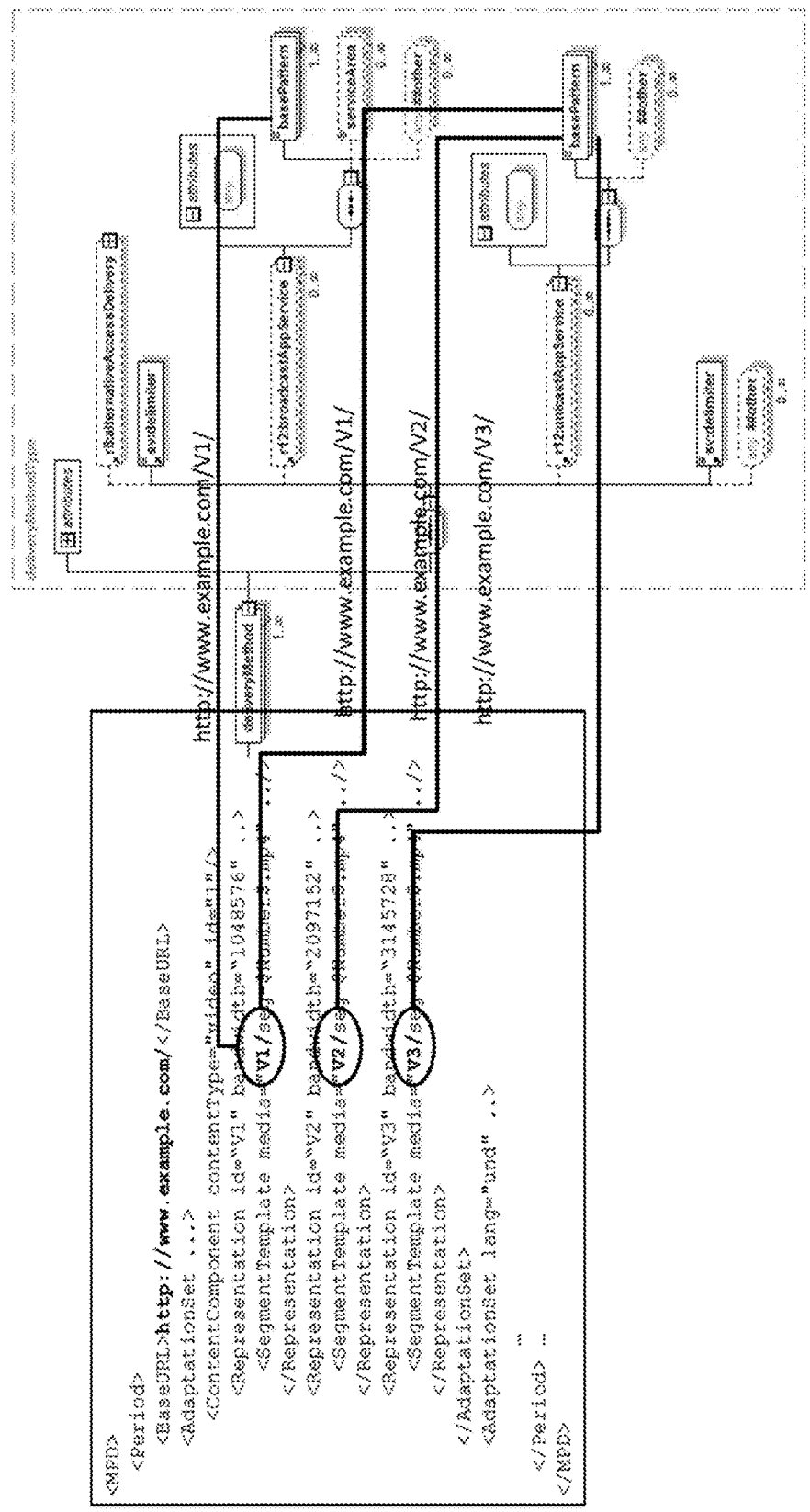
FIG. 12 is a conceptual diagram illustrating an example use case in which an MPD includes multiple representations.

FIG. 12 is a conceptual diagram illustrating an example use case in which an MPD includes multiple representations. In this example, only video representations are shown, although it should be understood that multiple audio representations may also be included in the MPD. In this example, the MPD contains multiple representations per media component, all representations are available over unicast, MPD@timeShiftBufferDepth>0, and when broadcast is available (RepID=V1), the DASH client cannot consume unicast-only representations (RepID=V2, V3).

In the example of FIG. 12, different types of video data (represented as "V1," "V2," and "V3") can be specified in the basePattern element of the r12:unicastAppService of the deliveryMethodType element. However, video data "V1" is also available via broadcast, and therefore, V1 can also be specified in the basePattern element of the r12:broadcastAppService of the deliveryMethodType element.

Figure 13:
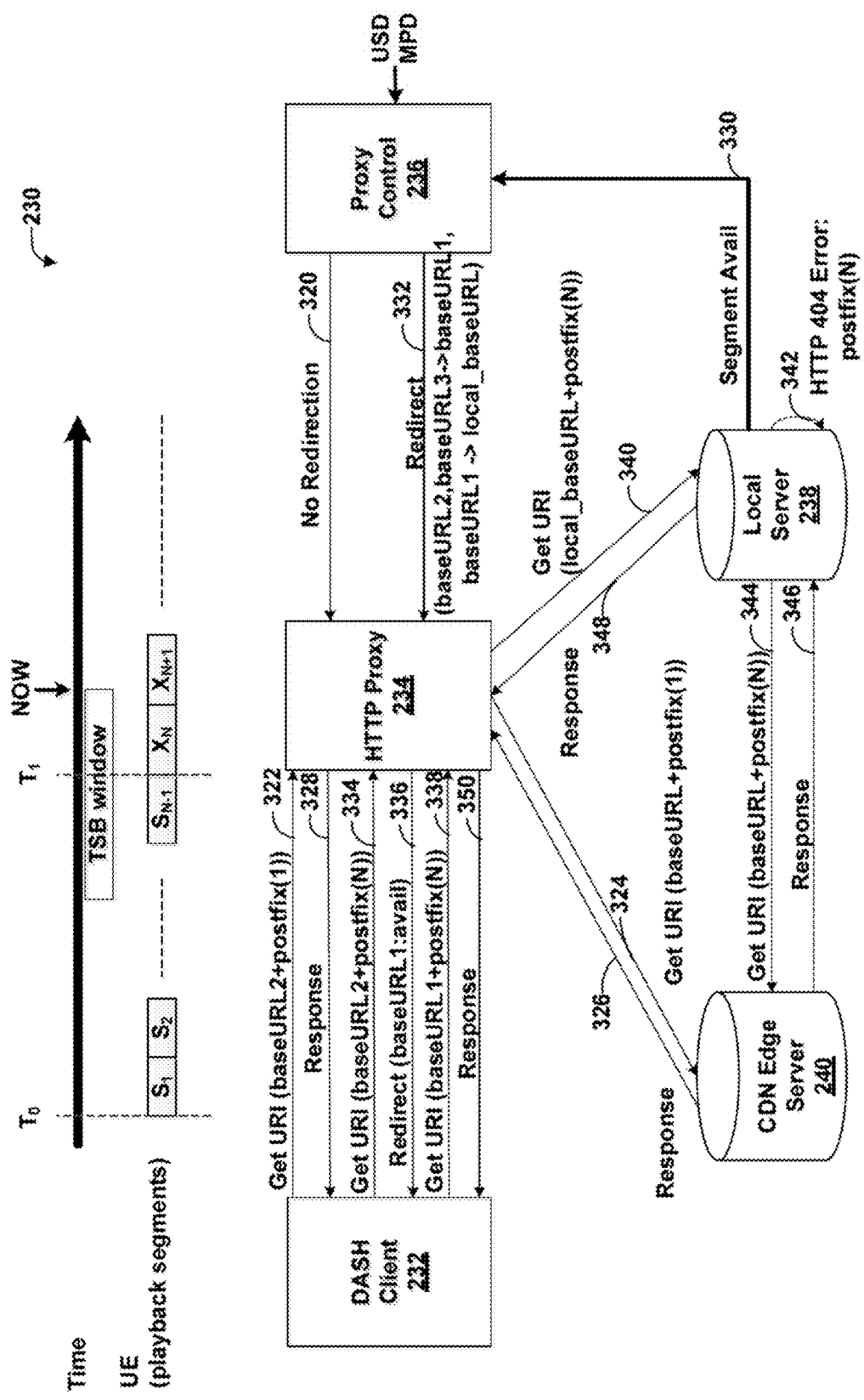
FIG. 13 is a conceptual diagram illustrating an example technique in accordance with the use case described with respect to FIG. 12.

FIG. 13 is a conceptual diagram illustrating an example technique in accordance with the use case described with respect to FIG. 12. At time<T₁, segments of Representation 2 are fetched using unicast. In particular, before time $T_1$, proxy control unit 236 configures HTTP proxy unit 234 not to perform redirection (320). Thus, when DASH client 232 sends an HTTP GET request for a segment before time $T_1$ (322), HTTP proxy unit 234 forwards the request to CDN edge server 240 (324). CDN edge server 240 responds to the request by sending the requested media data to HTTP proxy unit 234 (326), which forwards the media data to DASH client 232 (328).

When eMBMS is enabled, BM-SC will broadcast live edge segments of Representation 1. At time=$T_1$, broadcast segment $X_N$ is available at local server 238, so local server 238 sends data indicating the availability of segment $X_N$ to proxy control unit 236 (330). Thus, proxy control unit 236 configures HTTP proxy unit 234 to instruct DASH client 232 to request data of Representation 1 instead of Representation 2 or Representation 3. A Server and Network assisted DASH (SAND) enforcement message may be used to cause DASH client 232 to change to Representation 1 (a broadcast representation in this example).

That is, when DASH client 232 sends a request for data of Representation 2 or Representation 3 (334), HTTP proxy unit 234 responds with an HTTP redirect (e.g., HTTP 300 response) specifying Representation 1 instead (336). Thus, DASH client 232 requests a segment of Representation 1 (338), which HTTP proxy unit 234 intercepts and redirects to local server 238 (340). If the requested segment is available, local server 238 forwards the segment to HTTP proxy 234 (348). DASH client 232 might request non-live-edge segments of Representation 1 within the TSB window. In such a case, local server 238 may determine that there is an HTTP 404 error (342) for the segment, and in response, request the segment from CDN edge server 240 (344), which may send the segment to local server 238 in response (346). In either case, HTTP proxy unit 234 returns the received segment to DASH client 232 (350).

Figure 14:
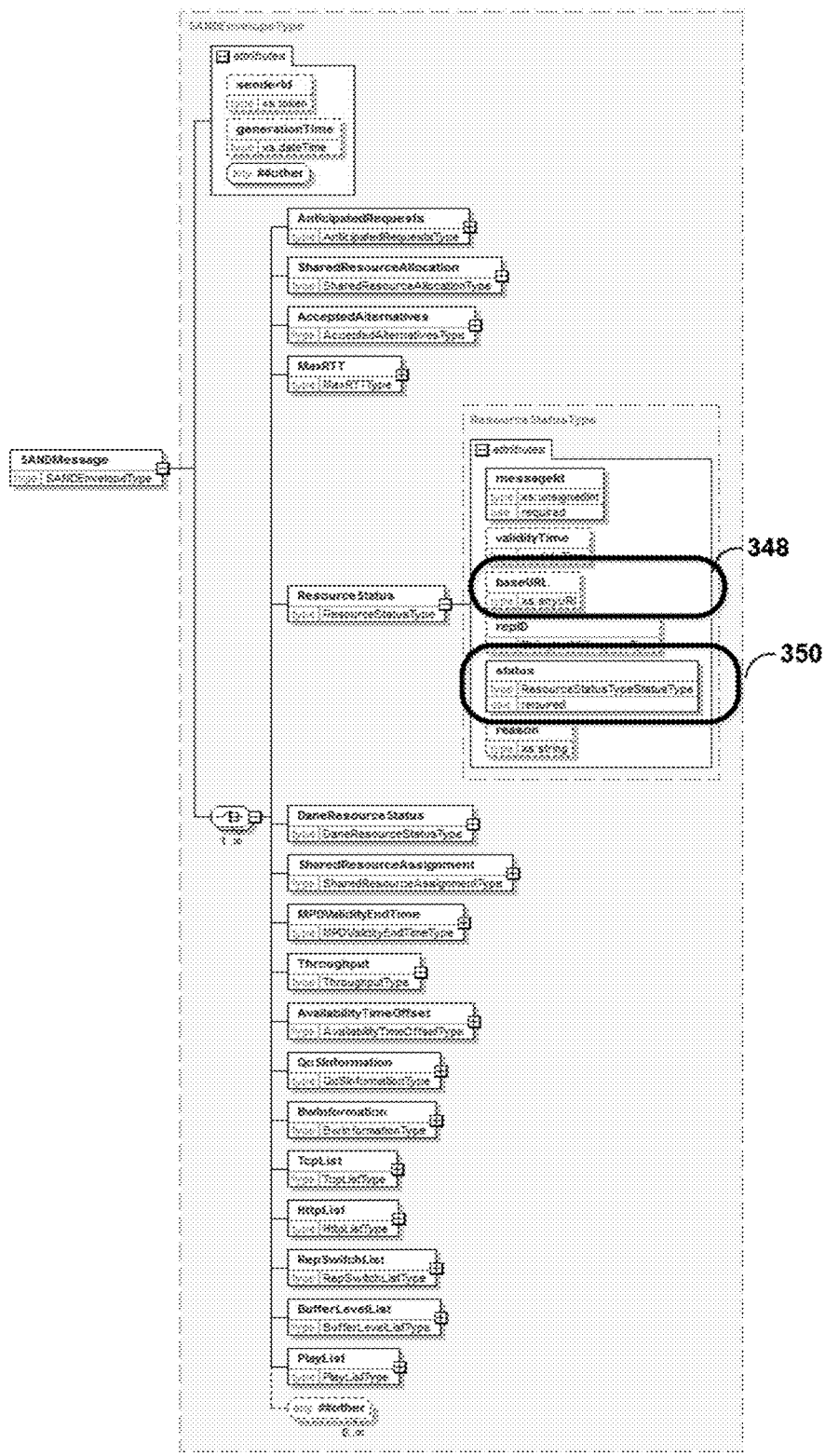
FIG. 14 is a conceptual diagram illustrating an example Server and Network assisted DASH (SAND) enforcement message.

FIG. 14 is a conceptual diagram illustrating an example SAND enforcement message. A SAND schema is defined in MPEG. Similar to SAND schema, SAMMO schema is defined in "3rd Generation Partnership Project; Technical Specification Group Services and System Aspects; Multimedia Broadcast/Multicast Service (MBMS) User service guidelines (Release 12)" TR 26.946, March 2015, available at www.3gpp.org/DynaReport/26946.htm.

A SAND message may include the following elements: @baseURL 348 is used to carry URI prefix that identifies a representation in MPD; Status 350 provides the status of all associated resources (available, unavailable or cached); Reasons: textual information of the reason. Similarly, MPEG is defining a SAND message, which may include similar information.

Figure 15:
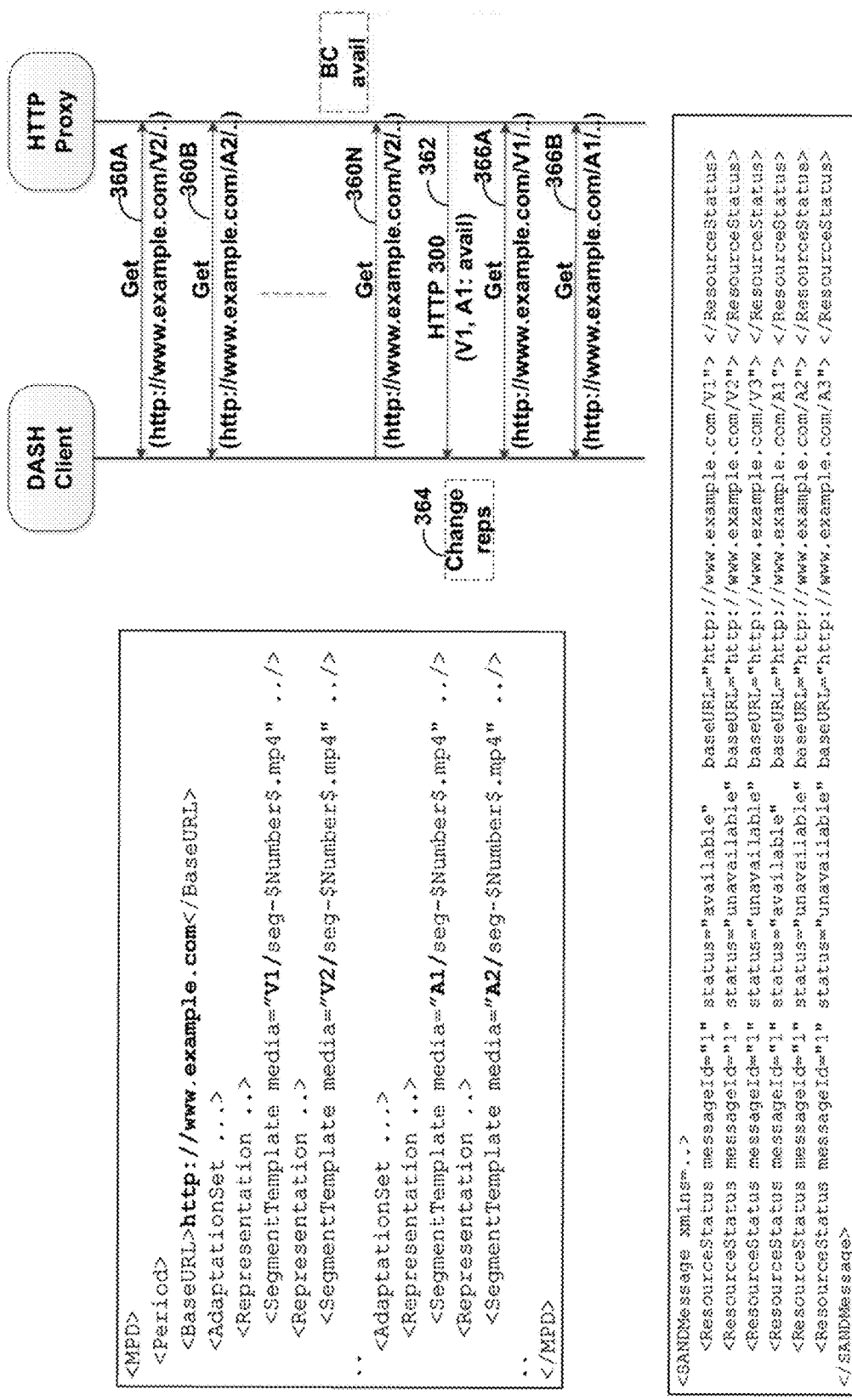
FIG. 15 is a conceptual diagram illustrating an example of DASH client behavior when receiving an HTTP 300 response (e.g., from the HTTP proxy unit).

FIG. 15 is a conceptual diagram illustrating an example of DASH client behavior when receiving an HTTP 300 response (e.g., from the HTTP proxy unit). The method of FIG. 15 is explained with respect to DASH client 232 and HTTP proxy unit 234 of FIGS. 9-11 and 13. However, it should be understood that DASH client 184 and HTTP proxy unit 186 of FIG. 6 or DASH client 110 and HTTP proxy unit 108 of FIG. 2 may also be configured to perform the method of FIG. 15.

In this example, DASH client 232 sends one or more GET requests to HTTP proxy unit 234 before a broadcast service is available, and HTTP proxy unit 234 forwards the requests to a server device in accordance with unicast, and also provides responses to the requests to DASH client 232 (360A-360N). After the broadcast service becomes available, when DASH client 232 sends a request for media data, HTTP proxy unit 234 may reply with an HTTP 300 response, including a redirection address (e.g., a localhost address) and an identifier for a different Representation (e.g., a broadcast representation for which segments are cached locally) (362). This may cause DASH client 232 to change representations (364), and then send subsequent HTTP GET requests that specify the newly selected representation, which HTTP proxy unit 234 redirects to a local server (e.g., local server unit 102), and returns replies including requested media data to DASH client 232 (366A-366B).

Figure 16:
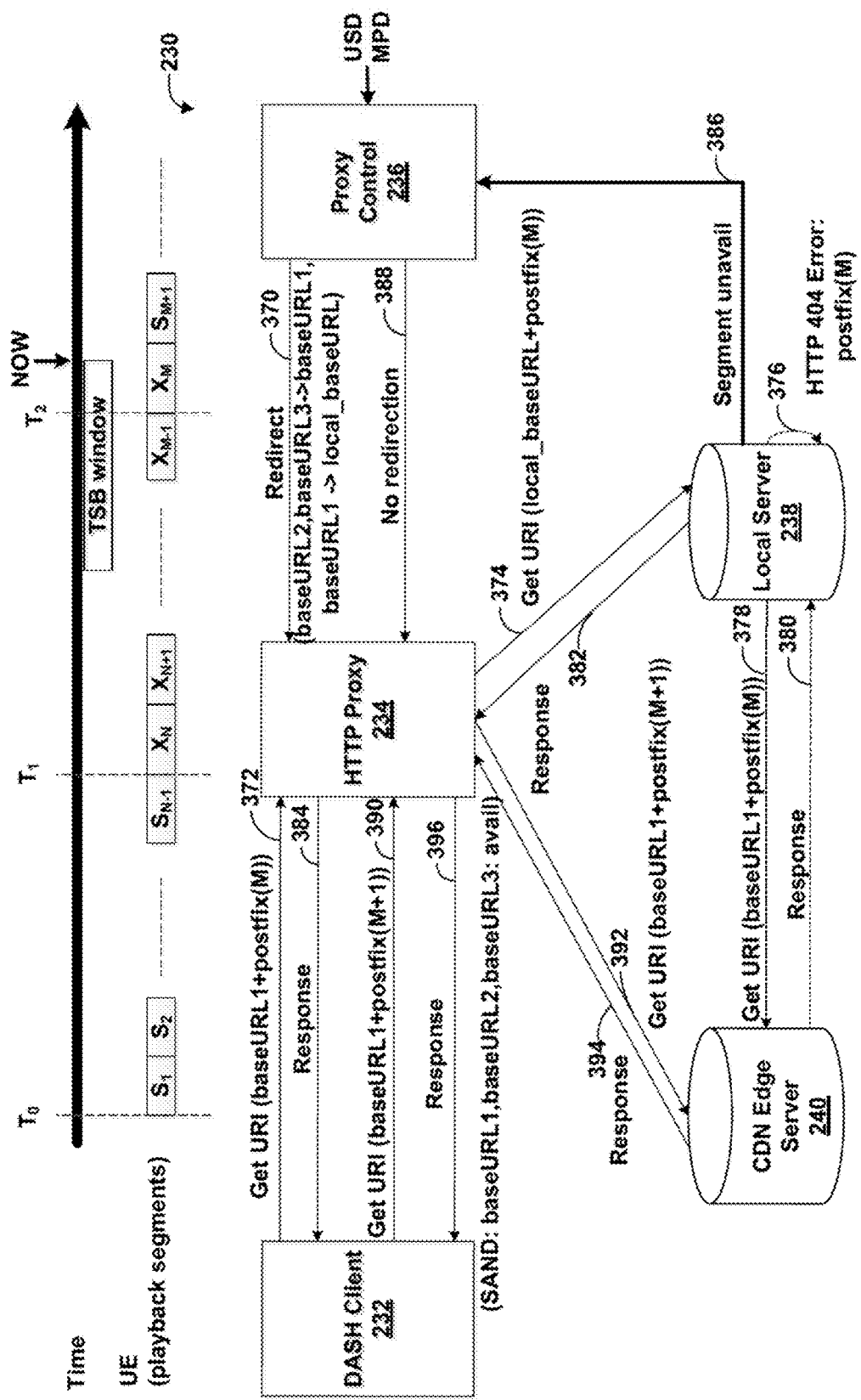
FIG. 16 is a conceptual diagram illustrating an example technique in accordance with the use case of FIG. 12 when configuring the HTTP proxy unit to direct the DASH client during a switch from broadcast to unicast.

FIG. 16 is a conceptual diagram illustrating an example technique in accordance with the use case of FIG. 12 when configuring the HTTP proxy unit to direct the DASH client during a switch from broadcast to unicast. That is, in this example, the broadcast service is initially available prior to time $T_2$, and becomes unavailable at time $T_2$. The example of FIG. 16 may represent a continuation of the example discussed with respect to FIG. 13.

Prior to time $T_2$, proxy control unit 236 configures HTTP proxy unit 234 to redirect requests specifying Representation 2 or Representation 3 to Representation 1 (and to local server 238 instead of CDN edge server 240) (370). It is assumed in this example that DASH client 232 has previously selected Representation 1. Thus, DASH client 232 requests a segment of Representation 1 (372), which HTTP proxy unit 234 intercepts and redirects to local server 238 (374). If the requested segment is available, local server 238 forwards the segment to HTTP proxy 234 (382). DASH client 232 might request non-live-edge segments of Representation 1 within the TSB window. In such a case, local server 238 may determine that there is an HTTP 404 error (376) for the segment, and in response, request the segment from CDN edge server 240 (378), which may send the segment to local server 238 in response (380). In either case, HTTP proxy unit returns the received segment to DASH client 232 (384).

At time=$T_2$, local server 238 sends an indication to proxy control unit 236 that the broadcast service is no longer available (386). Thus, proxy control unit 236 configures HTTP proxy unit 234 not to redirect requests to local server 238 (388). Accordingly, after DASH client 232 requests a segment following time $T_2$, such as segment $X_M$ (390), HTTP proxy unit 234 may use unicast to satisfy segment $X_M$ request. That is, HTTP proxy unit 234 may submit the request for segment $X_M$ to CDN edge server 240 (392), which may send a response including the requested media data (394). HTTP proxy unit 234 may forward the received media data to DASH client 232, along with data indicating that other unicast representations are available as well using a SAND assistance message (396). For example, HTTP proxy unit 234 may send a SAND message according to FIG. 14. Later after time $T_2$, based on unicast bandwidth, DASH client 232 may change to Representation 2 (or Representation 3). A potential issue is that the user might go back to segment $S_{M-2}$ of Representation 2 within TSB window, unicast delivery can be used, but similar segment $X_{M-2}$ of Representation 1 might already be cached at local server 238.

Figure 17:
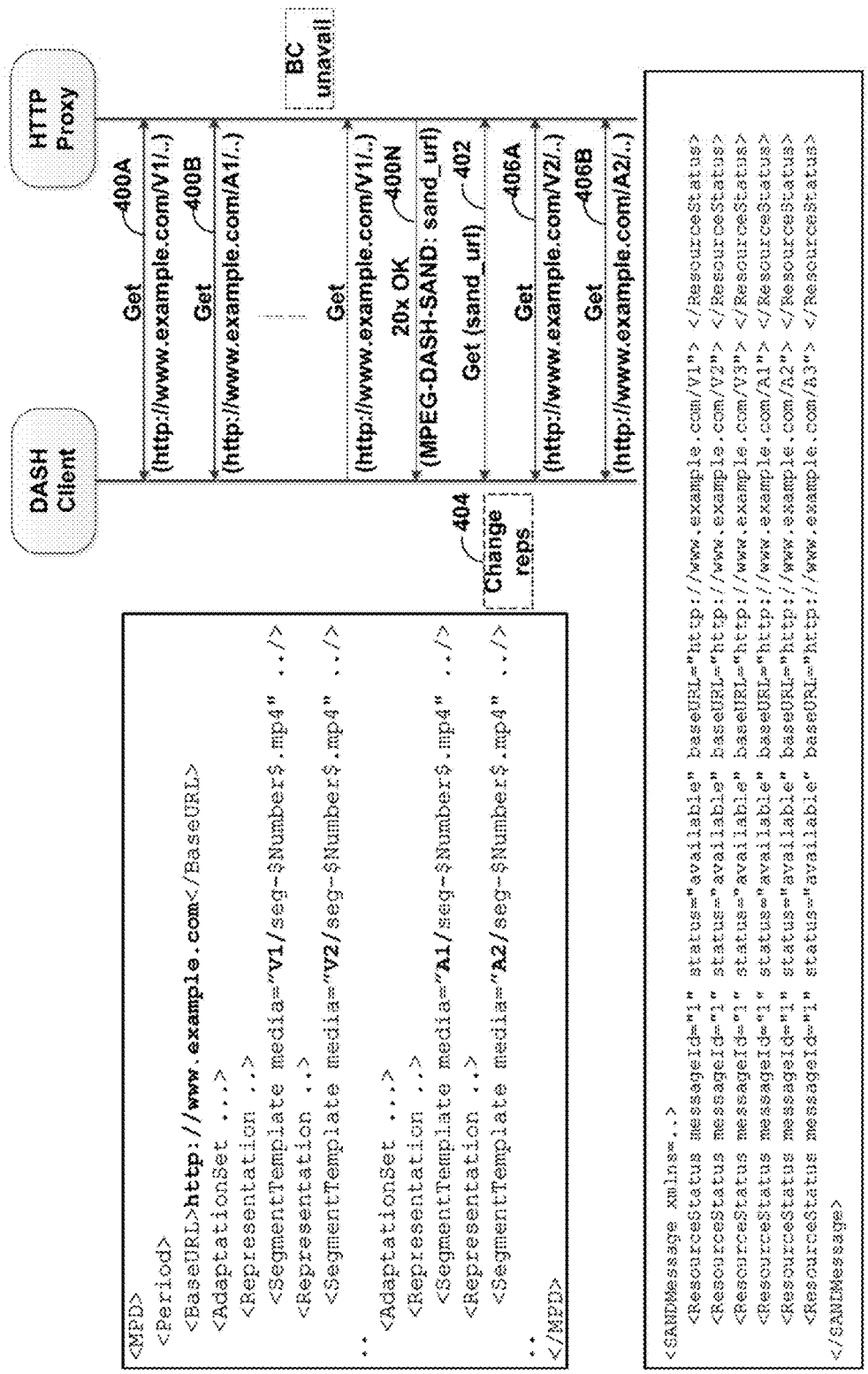
FIG. 17 is a conceptual diagram illustrating an example of DASH client behavior when receiving SAND assistance.

FIG. 17 is a conceptual diagram illustrating an example of DASH client behavior when receiving SAND assistance. The method of FIG. 17 is explained with respect to DASH client 232 and HTTP proxy unit 234 of FIGS. 9-11, 13, and 16. However, it should be understood that DASH client 184 and HTTP proxy unit 186 of FIG. 6 or DASH client 110 and HTTP proxy unit 108 of FIG. 2 may also be configured to perform the method of FIG. 17.

In this example, DASH client 232 sends one or more GET requests to HTTP proxy unit 234 while a broadcast service is available, and HTTP proxy unit 234 redirects the requests to a local server in, and also provides responses to the requests to DASH client 232 (400A-400N). After the broadcast service becomes unavailable, when DASH client 232 sends a request for media data, HTTP proxy unit 234 may reply with an HTTP 20x response, including a SAND (or SAMMO) message specifying a URL for a different Representation (e.g., a unicast representation) (402). This may cause DASH client 232 to change representations (404), and then send subsequent HTTP GET requests that specify the newly selected representation, which HTTP proxy unit 234 forwards to a separate server device, and returns replies including requested media data to DASH client 232 (406A-406B).

Figure 18:
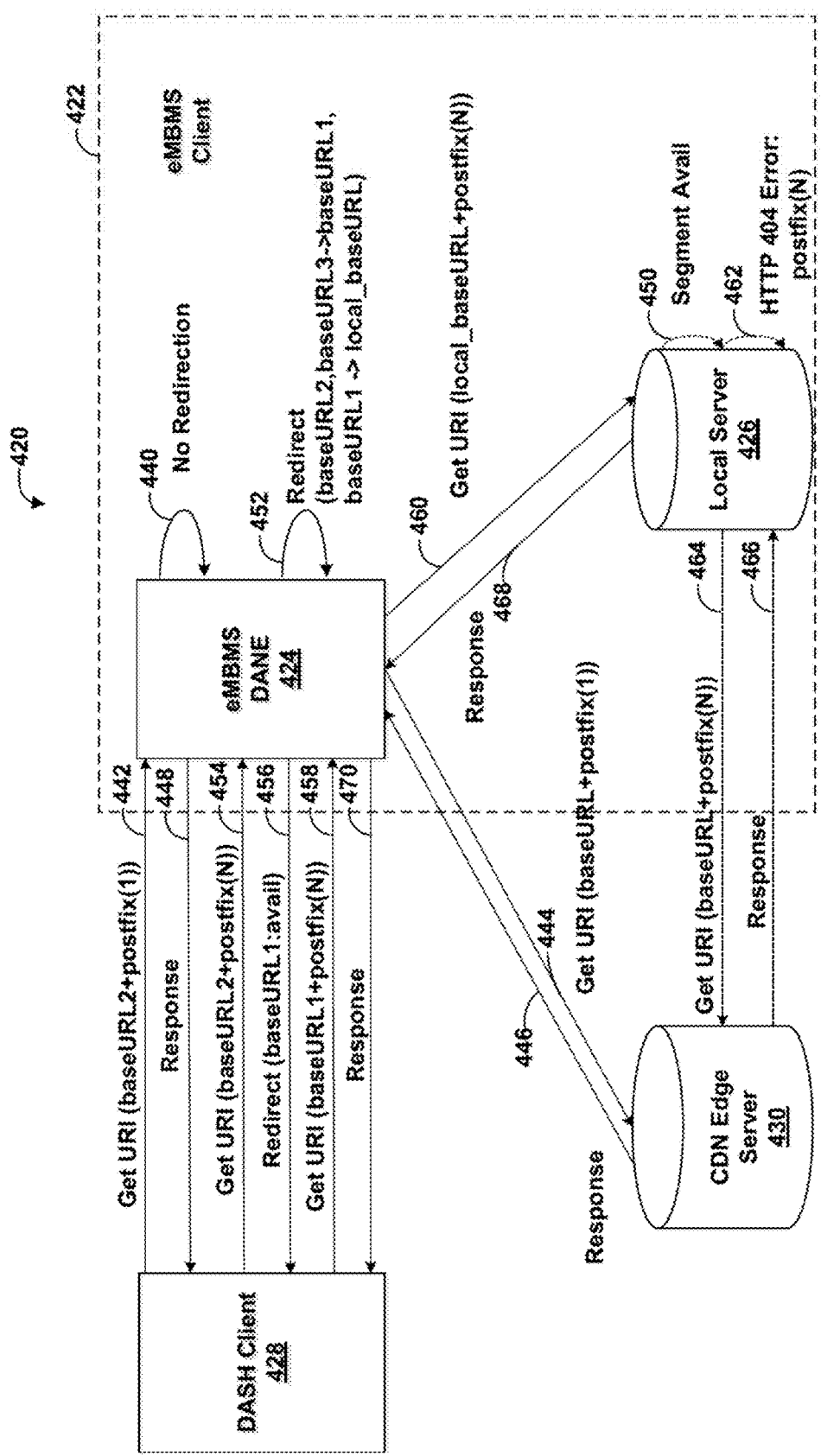
FIG. 18 is a conceptual diagram illustrating an example technique for using an eMBMS DASH aware network element (DANE) in accordance with this disclosure.

FIG. 18 is a conceptual diagram illustrating an example technique for using an eMBMS DASH Aware Network Element (DANE) in accordance with this disclosure. That is, system 420 of FIG. 18 includes DASH client 428, CDN edge server 430, and eMBMS middleware unit 422 including eMBMS DANE 424 and local server 246. An example according to FIG. 18 is described below.

At time<$T_1$, segments of Representation 2 are fetched using unicast. That is, initially, eMBMS DANE 424 is configured not to use redirection (440). Thus, when DASH client 428 requests a segment of Representation 2 (442), eMBMS DANE 424 forwards the request to CDN edge server 430 (444). CDN edge server 430 sends a response including the requested media data to eMBMS DANE 424 (446), which eMBMS DANE 424 forwards to DASH client 428 (448).

When eMBMS is enabled, a BM-SC (not shown) will broadcast live edge segments of Representation 1 to local server 426. Thus, local server 426 determines that segments of the broadcast representation, i.e., Representation 1, are available (450). Accordingly, eMBMS middleware unit 422 configures eMBMS DANE 424 to redirect requests for Representations 2 and 3 to Representation 1, and to redirect requests for Representation 1 to local server 246 (452). Accordingly, when DASH client 428 requests a segment of, for example, Representation 2 (454), for which a corresponding segment of Representation 1 has been received by local server 426 via the broadcast service, eMBMS DANE 424 may send a SAND enforcement message specifying a redirection to Representation 1 instead of Representation 2 (456). This may cause DASH client 428 to switch to Representation 1 and request the segment from Representation 1 instead of Representation 2 (458). eMBMS DANE 424 may then forward the request to local server 426, which may send the segment in a response to eMBMS DANE 424 (468), assuming the segment is cached locally. If the segment is not cached locally, local server 426 may determine that an HTTP 404 error has occurred (462), and thus request the segment from CDN edge server 430 (464), which may send the segment to local server 426 (466), which may send the segment to eMBMS DANE 424 (468). In either case, eMBMS DANE 424 may send the segment to DASH client 428 (470).

Figure 19:
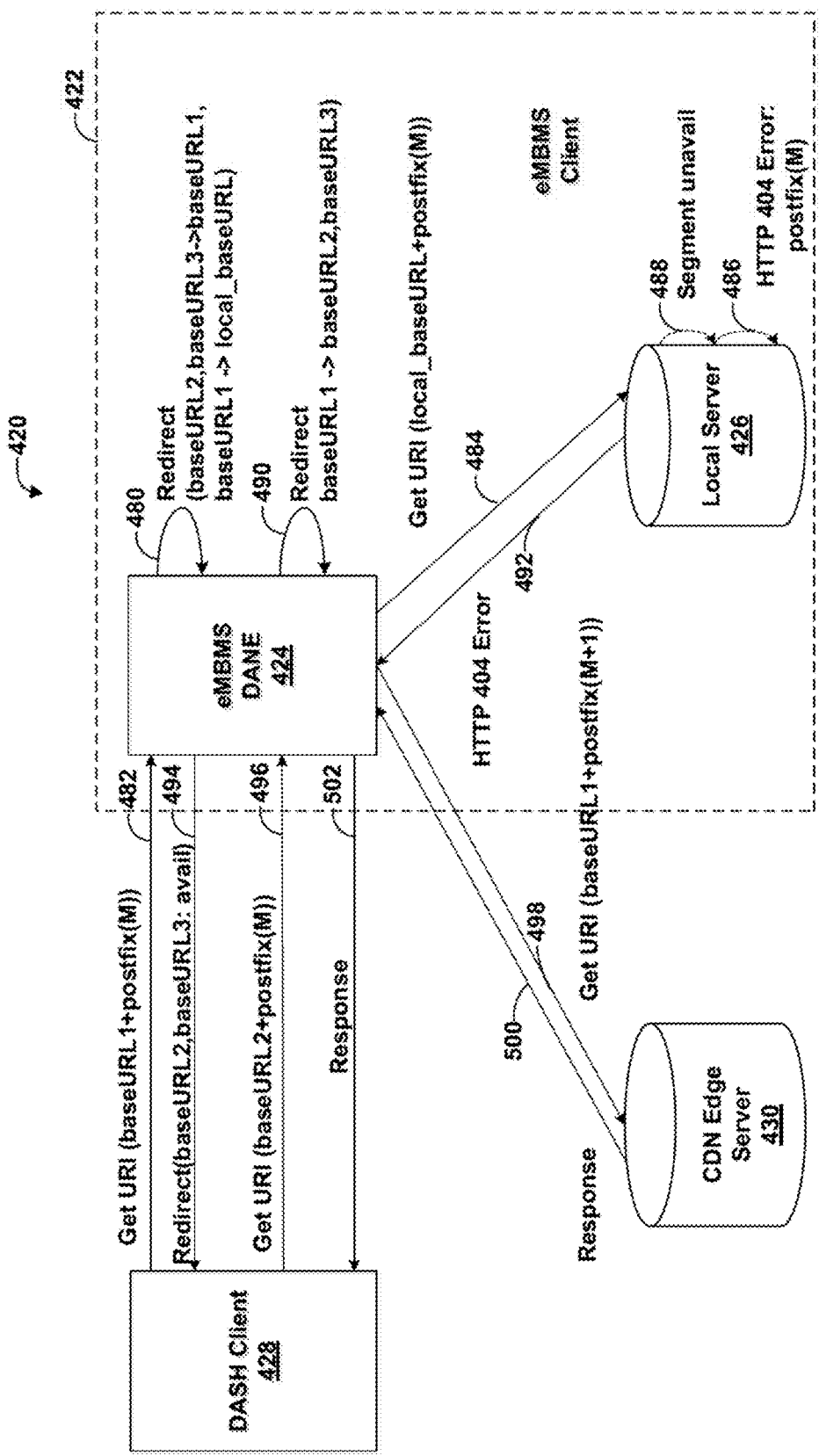
FIG. 19 is a conceptual diagram illustrating an example technique for using an eMBMS DASH aware network element (DANE) in accordance with this disclosure.

FIG. 19 is a conceptual diagram illustrating an example technique for using an eMBMS DASH aware network element (DANE) in accordance with this disclosure. This example may be continuous with the example of FIG. 18. That is, the timelines in FIGS. 18 and 19 are the same. However, it should be understood that a subsequent switch from unicast to broadcast may also be made, e.g., as discussed above with respect to FIG. 18.

Initially, eMBMS DANE 424 is configured to redirect requests for Representations 2 and 3 to Representation 1 and to send requests for Representation 1 to local server 426 (480). It is also assumed in this example that DASH client 428 is configured, prior to time $T_2$, to select Representation 1. Thus, DASH client 428 sends a request for a segment from Representation 1 (482). eMBMS DANE 424 forwards this request to local server 426 (484). In this example, local server 426 determines that there is an HTTP 404 error (486), and that the requested segment is not available (488). This causes eMBMS middleware unit 422 to configure eMBMS DANE 424 to redirect requests for Representation 1 to either Representation 2 or Representation 3 (490).

Local server 426 also returns an HTTP 404 error to eMBMS DANE 424 in this example (492). Thus, eMBMS DANE 424 returns a redirection message to DASH client 428, indicating that DASH client 428 should select a different representation, e.g., Representation 2 or 3 (494). This redirection message may comprise a SAND enforcement message. In this example, DASH client 428 selects Representation 2 (baed on bandwidth availability), and thus, sends a request for a corresponding segment from Representation 2 to eMBMS DANE 424 (496). eMBMS DANE 424 forwards the request to CDN edge server 430 (498), which responds with the requested segment to eMBMS DANE 424 (500). Thus, eMBMS DANE 424 forwards the segment to DASH client 428 (502). The user might go back to segment $S_{M-2}$ of Representation 2 within TSB window. Unicast delivery could be used, but similar segment $X_{M-2}$ of Representation 1 might already be cached at local server 426.

Figure 20:
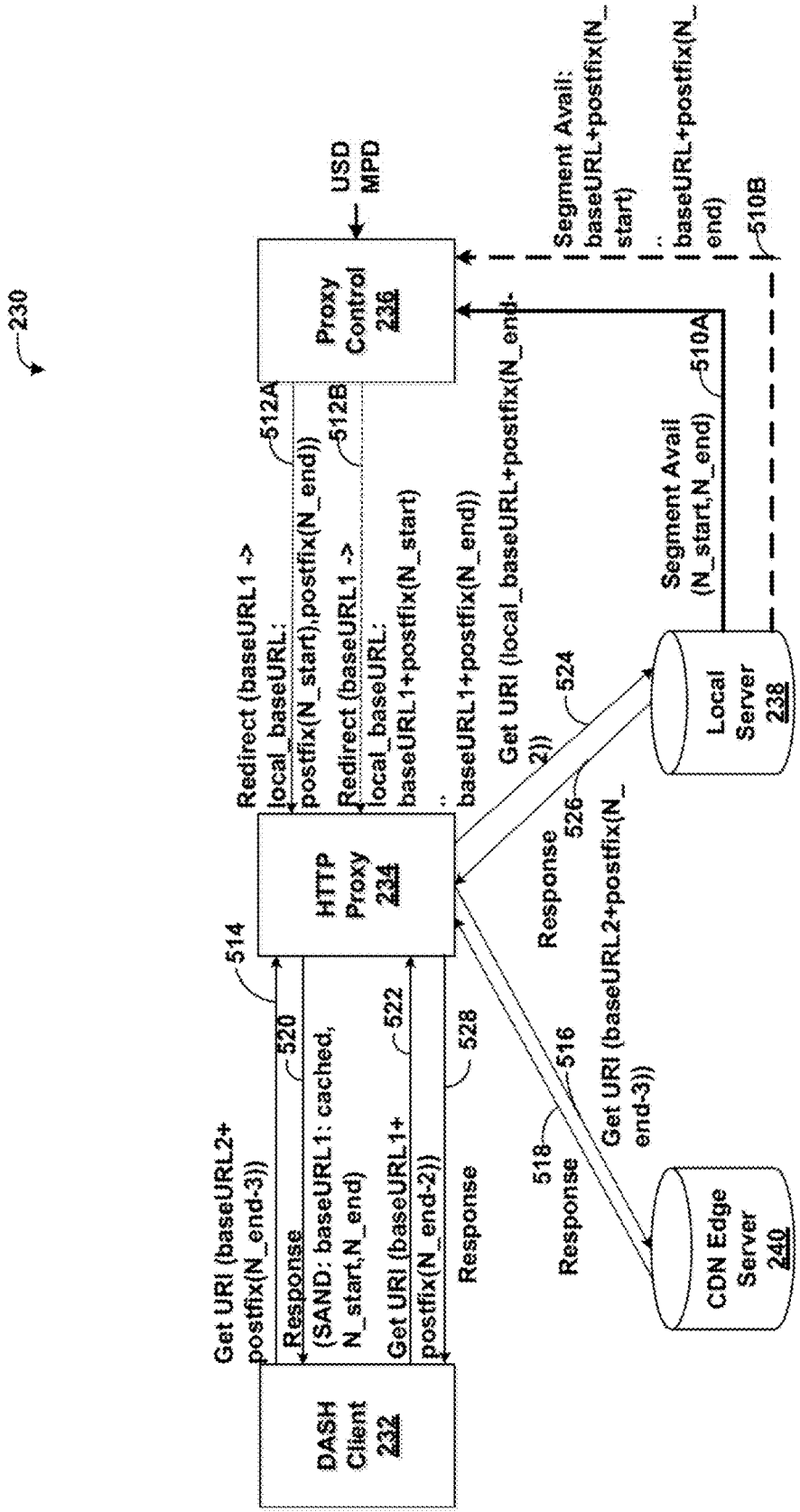
FIG. 20 is a conceptual diagram illustrating an example technique in which the HTTP proxy unit assists the DASH client to use alternative local segments.

FIG. 20 is a conceptual diagram illustrating an example technique in which HTTP proxy unit 234 assists DASH client 232 to use alternative, locally cached segments when such segments are available. In this example, local server 238 sends an initial message indicating available segments to proxy control unit 238 (510A), as well as update messages indicating updated available segments (510B). Proxy control unit 236 configures HTTP proxy unit 234 to direct segment URLs for segments of Representation 1 that are cached (e.g., those with segment numbers between [N_start,N_end]) to local server 238 (512A) and periodically provides an updated list of segment URLs that can be satisfied from local server 238 (512B). In this example, N_start represents the segment number of the oldest segment cached in local server 238, while N_end represents the segment number of the latest segment cached in local server 238.

When the local server removes cached segments, proxy control unit 236 updates the redirection rules (512B). DASH client 232 may request an uncached segment (514), in which case HTTP proxy unit 234 may forward the request to CDN edge server 240 (516), which may respond by sending the segment to HTTP proxy unit 234 (518), which may forward the segment to DASH client 232 (520). However, if DASH client 232 sends a request for a segment of a representation that is not cached but corresponds to a cached segment of a different representation, HTTP proxy unit 234 may send a SAND assistance message to inform DASH client 232 that segments for Representation 1 from N_start to N_end are already cached. For example, DASH client 232 may request segment N_start of Representation 2 to HTTP proxy unit 234, and HTTP proxy unit 234 may respond with a SAND message indicating that segment N_start of Representation 1 is available (e.g., cached by local server 238).

In response, DASH client 232 may request the segment from Representation 1 that is already cached instead (522). Thus, HTTP proxy unit 234 may redirect the request for the segment to local server 238 (524), which may provide the segment to HTTP proxy unit 234 (526), which may forward the segment to DASH client 232 (528).

A SAND message may use @baseURL to identify segment URLs, as shown in the examples below:

```
<SANDMessage xmlns=..><ResourceStatus messageId="1"
status="cached"
baseURL="http://www.example.com/V1/seg-(N_start).mp4">
</ResourceStatus>
<ResourceStatus messageId="1" status="cached"
baseURL="http://www.example.com/V1/seg-(N_start+1).mp4">
</ResourceStatus>
....
<ResourceStatus messageId="1" status="cached"
baseURL="http://www.example.com/V1/seg-(N_end-1).mp4">
</ResourceStatus>
<ResourceStatus messageId="1" status="cached"
baseURL="http://www.example.com/V1/seg-(N_end).mp4">
```

-continued

```
</ResourceStatus>
<ResourceStatus messageId="1" status="cached"
baseURL="http://www.example.com/A1/seg-(N_start).mp4">
</ResourceStatus>
<ResourceStatus messageId="1" status="cached"
baseURL="http://www.example.com/A1/seg-(N_start+1).mp4">
</ResourceStatus>
....
<ResourceStatus messageId="1" status="cached"
baseURL="http://www.example.com/A1/seg-(N_end-1).mp4">
</ResourceStatus>
<ResourceStatus messageId="1" status="cached"
baseURL="http://www.example.com/A1/seg-(N_end).mp4">
</ResourceStatus>
</SANDMessage>
```

In addition or in the alternative, such data may be merged with an older SAND assistance message sent during a broadcast to unicast transition (e.g., at time=T2 of FIG. 16):

```
<SANDMessage xmlns=..>
<ResourceStatus messageId="1" status="available"
baseURL="http://www.example.com/V1"> </ResourceStatus>
<ResourceStatus messageId="1" status="available"
baseURL="http://www.example.com/V2"> </ResourceStatus>
<ResourceStatus messageId="1" status="available"
baseURL="http://www.example.com/V3"> </ResourceStatus>
<ResourceStatus messageId="1" status="available"
baseURL="http://www.example.com/A1"> </ResourceStatus>
<ResourceStatus messageId="1" status="available"
baseURL="http://www.example.com/A2"> </ResourceStatus>
<ResourceStatus messageId="1" status="available"
baseURL="http://www.example.com/A3"> </ResourceStatus>
</SANDMessage>
```

Figure 21:
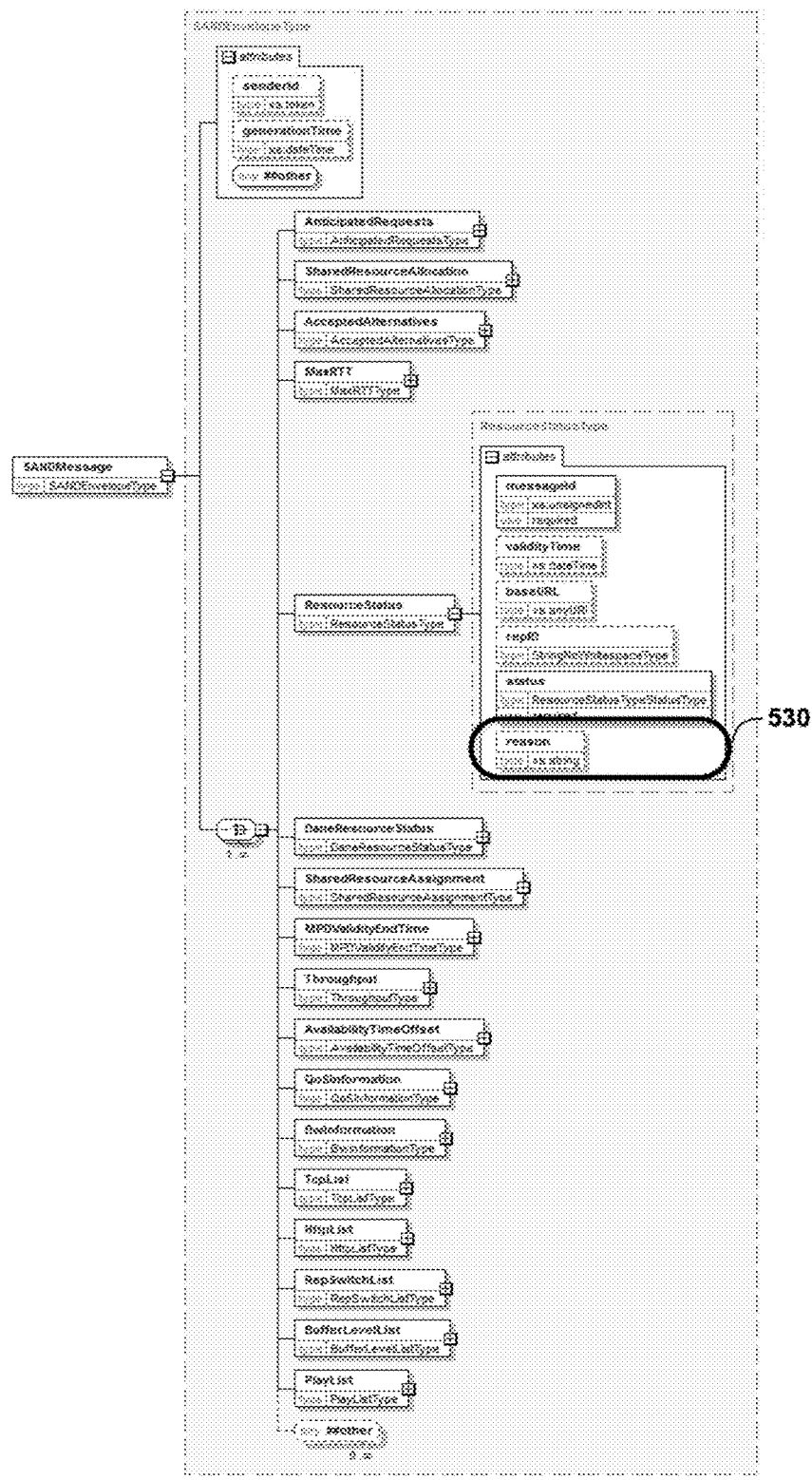
FIG. 21 is a conceptual diagram illustrating data that may be included in a SAND message in an example according to this disclosure.

FIG. 21 is a conceptual diagram illustrating reason data 530 that may be included in a SAND message in an example according to this disclosure. In this example, for resources with status=cached, attribute "reason" 530 can carry a comma separated string (that is, comma separated values) representative of: N_start and N_end. For example:

```
<SANDMessage xmlns=..>
<ResourceStatus messageId="1" status="cached" reason="10,100"
baseURL="http://www.example.com/V1"> </ResourceStatus>
<ResourceStatus messageId="1" status="cached" reason="10,100"
baseURL="http://www.example.com/A1"> </ResourceStatus>
</SANDMessage>
```

Figure 22:
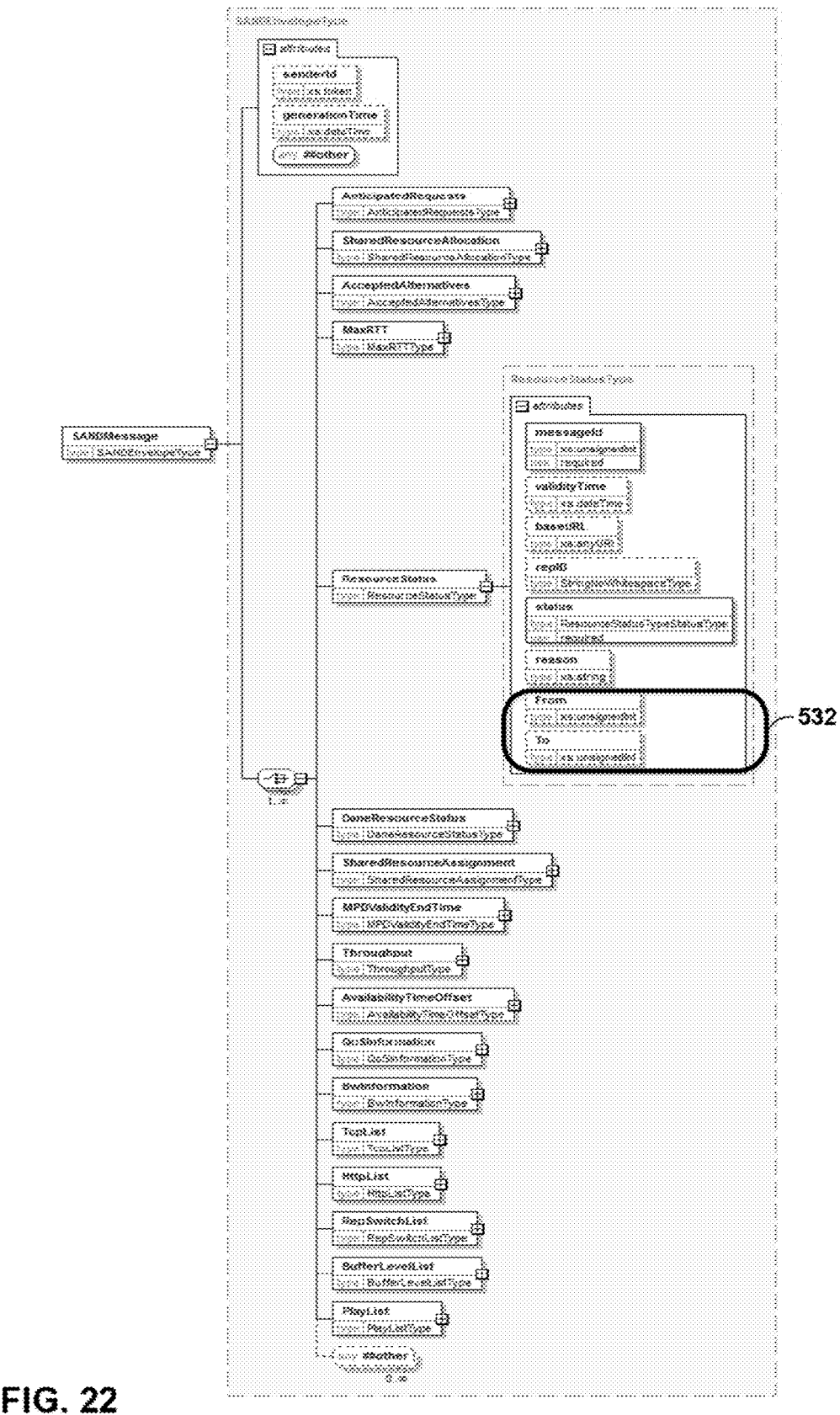
FIG. 22 is a conceptual diagram illustrating another example set of data that may be included in a SAND message in accordance with this disclosure.

FIG. 22 is a conceptual diagram illustrating another example set of data 532 that may be included in a SAND message in accordance with this disclosure. As opposed to adding data to the "reason" field 530 as shown in FIG. 21, in this example, data 532 may include a message having two fields: a "from" field and an "end" field. That is, two extra attributes—"From" and "To"—are added to ResouceStatus to identify N_start and N_end, respectively. The following is an example:

```
<SANDMessage xmlns=..>
<ResourceStatus messageId="1" status="cached" From=10 To=100
baseURL="http://www.example.com/V1"> </ResourceStatus>
<ResourceStatus messageId="1" status="cached" From=10 To=100
baseURL="http://www.example.com/A1"> </ResourceStatus>
</SANDMessage>
```

Alternatively, "From" may identify availability start time of seg(N_start) and "To" may identify availability start time of seg(N_end).

In one example according to the techniques of this disclosure, a regular expression may be used. For resources with status=cached, attribute baseURL can carry a regular expression to identify the range of segment URL between N_start (=10) and N_end (=100). For example:

```
<SANDMessage xmlns=..>
<ResourceStatus messageId="1" status="cached" baseURL="
http:\/\/www\.example\.com\/V1\/seg-(([1-9][0-9])|100)\.mp4">
</ResourceStatus>
<ResourceStatus messageId="1" status="cached" baseURL="
http:\/\/www\.example\.com\/A1\/seg-(([1-9][0-9])|100)\.mp4">
</ResourceStatus>
</SANDMessage>
```

In one example according to the techniques of this disclosure, the order of statuses in the segment list may be changed by using element DaneResourceStatus in SAND schema. As noted above, a regular expression may be used in the "resource" section for compact representation of the SAND message. In this example, a new status may be used: "available/cached" to indicate that segments will be: Returned with HTTP status 200 OK when requested during segment live edge timeline, or Returned with HTTP status 200 OK when requested within TSB timeline window indicated in MPD. The following is an example:

```
<SANDMessage xmlns=..>
<DaneResourceStatus messageId="1" status="cached">
    <resource>http://www.example.com/V1/seg-(N_start).mp4</resource>
    <resource>http://www.example.com/V1/seg-(N_start+1).mp4</resource>
    ....
    <resource>http://www.example.com/V1/seg-(N_end-1).mp4</resource>
    <resource>http://www.example.com/V1/seg-(N_end).mp4</resource>
    <resource>http://www.example.com/A1/seg-(N_start).mp4 </resource>
    <resource>http://www.example.com/A1/seg-(N_start+1).mp4</resource>
    ....
    <resource>http://www.example.com/A1/seg-(N_end-1).mp4</resource>
    <resource>http://www.example.com/A1/seg-(N_end).mp4</resource>
</ DaneResourceStatus >
</SANDMessage>
```

Figure 23:
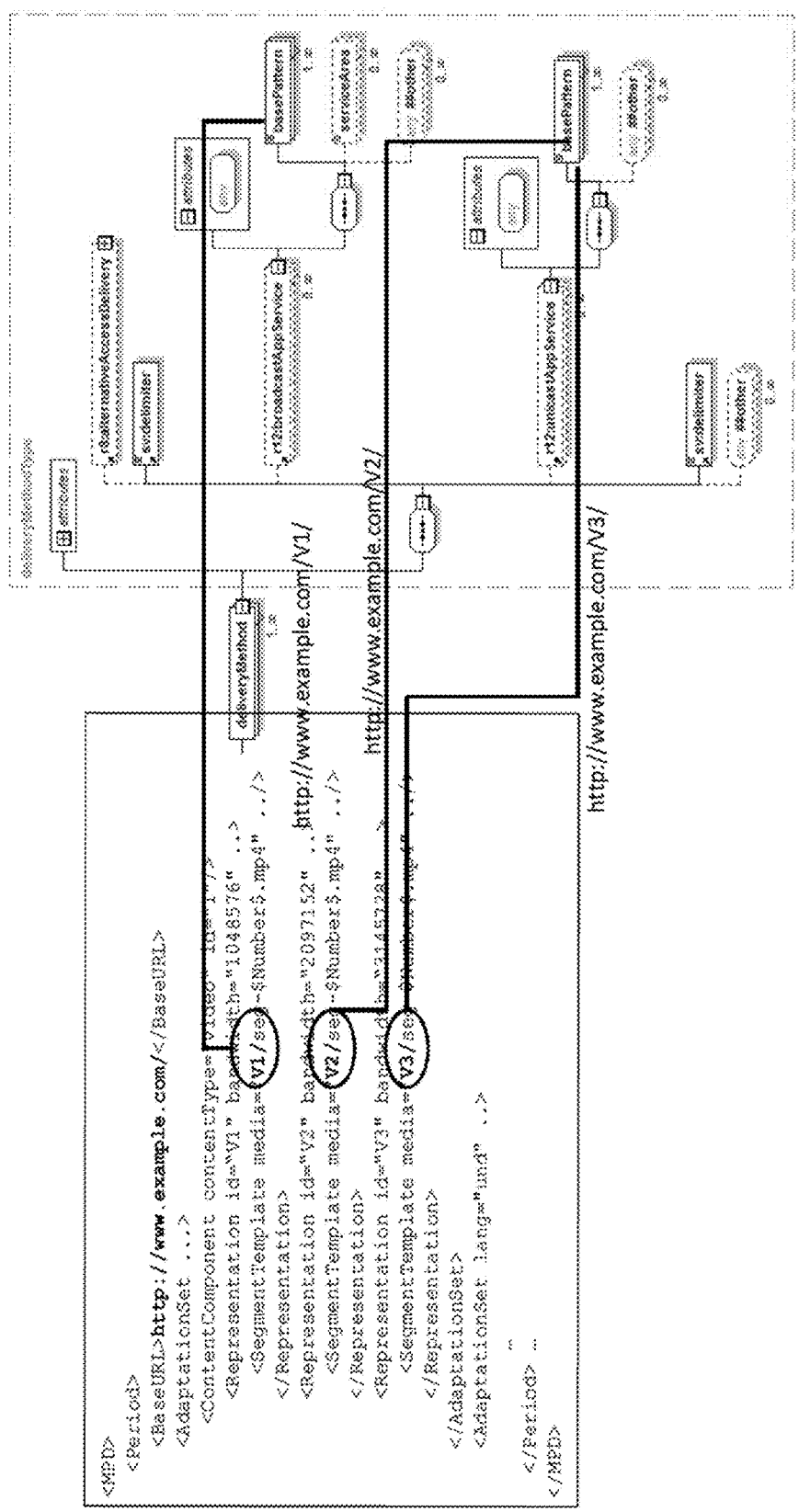
FIG. 23 is a conceptual diagram illustrating an example MPD with multiple representations.

FIG. 23 is a conceptual diagram illustrating an example MPD with multiple representations. In this example, only video representations are shown, although it should be understood that multiple audio representations may also be included in the MPD. A use case in accordance with this example is: the MPD contains multiple representations per media component, broadcast representation is not available over unicast (e.g., broadcast representation is encoded with high bit rate that cannot be satisfied over unicast connection), MPD@timeShiftBufferDepth>0, and when broadcast is available (RepID=V1), DASH client cannot consume live edge unicast representations (RepID=V2, V3).

In the example of FIG. 23, different types of video data (represented as "V1," "V2," and "V3") can be specified in either the basePattern element of the r12:unicastAppService of the deliveryMethodType element or the basePattern element of the r12:broadcastAppService of the deliveryMethodType element. In this example, "V1" is available via broadcast, and therefore, "V1" can be specified in the basePattern element of the r12:broadcastAppService. Likewise, in this example, "V2" and "V3" are available via unicast, and therefore, "V2" and "V3" can be specified in the basePattern element of the r12:unicastAppService.

Figure 24:
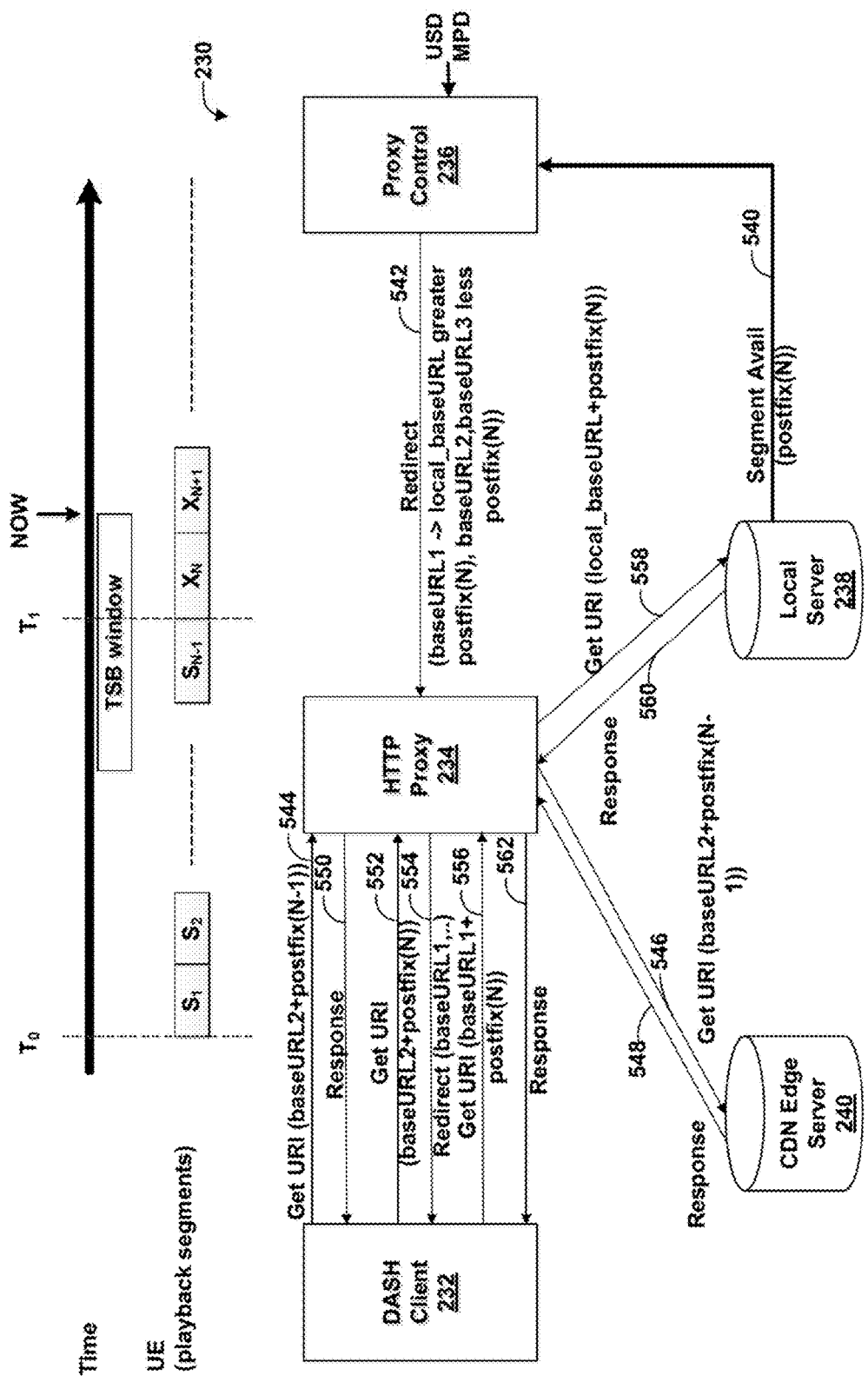
FIG. 24 is a conceptual diagram illustrating an example technique for configuring the HTTP proxy unit to direct the DASH client during a switch from unicast to broadcast in accordance with the use case of FIG. 23.

FIG. 24 is a conceptual diagram illustrating an example technique for configuring HTTP proxy unit 234 to direct DASH client 232 during a switch from a unicast service to a broadcast service in accordance with the use case of FIG. 23. When eMBMS is enabled, a BM-SC (not shown) will broadcast live edge segments of Representation 1 to local server 238. Proxy control unit 236 configures HTTP proxy unit 234 to direct segments requesting URLs specifying Representation 1 with segment numbers greater than [N_start] to local server 238, and to direct segment URLs for Representation 2 and Representation 3 with segment numbers less than [N_start] to CDN edge server 240 (542).

At time<$T_1$, segments of Representation 2 are fetched using unicast. For example, local server 238 may advertise a list of available segments to proxy control unit 236 (540). This list may include segments including and subsequent to segment N. Proxy control unit 236 configures HTTP proxy unit 234 to redirect requests for media data in the list to local server 238 (542). Thus, if DASH client 232 requests a segment prior to segment N (544), HTTP proxy unit 234 may forward the request to CDN edge server 240 (546). CDN edge server may send the requested segment to HTTP proxy 234 (548), which may forward the segment to DASH client 232 (550).

In this example, N_start represents the segment number of the oldest segment cached in local server. SAND enforcement may be used to allow DASH client 232 to change to broadcast segments of Representation 1. That is, if DASH client 232 requests a segment of Representation 2 that corresponds to a segment of Representation 1 (552), HTTP proxy unit 234 may send a SAND enforcement message to DASH client 232 indicating that the corresponding segment of Representation 1 is available (554). Accordingly, DASH client 232 may switch to Representation 1 and request the segment from Representation 1 (556). HTTP proxy unit 234 may redirect the request to local server 238 (558). Local server 238 may send the segment in a response to HTTP proxy unit 234 (560), which may forward the segment to DASH client 232 (562).

Figure 25:
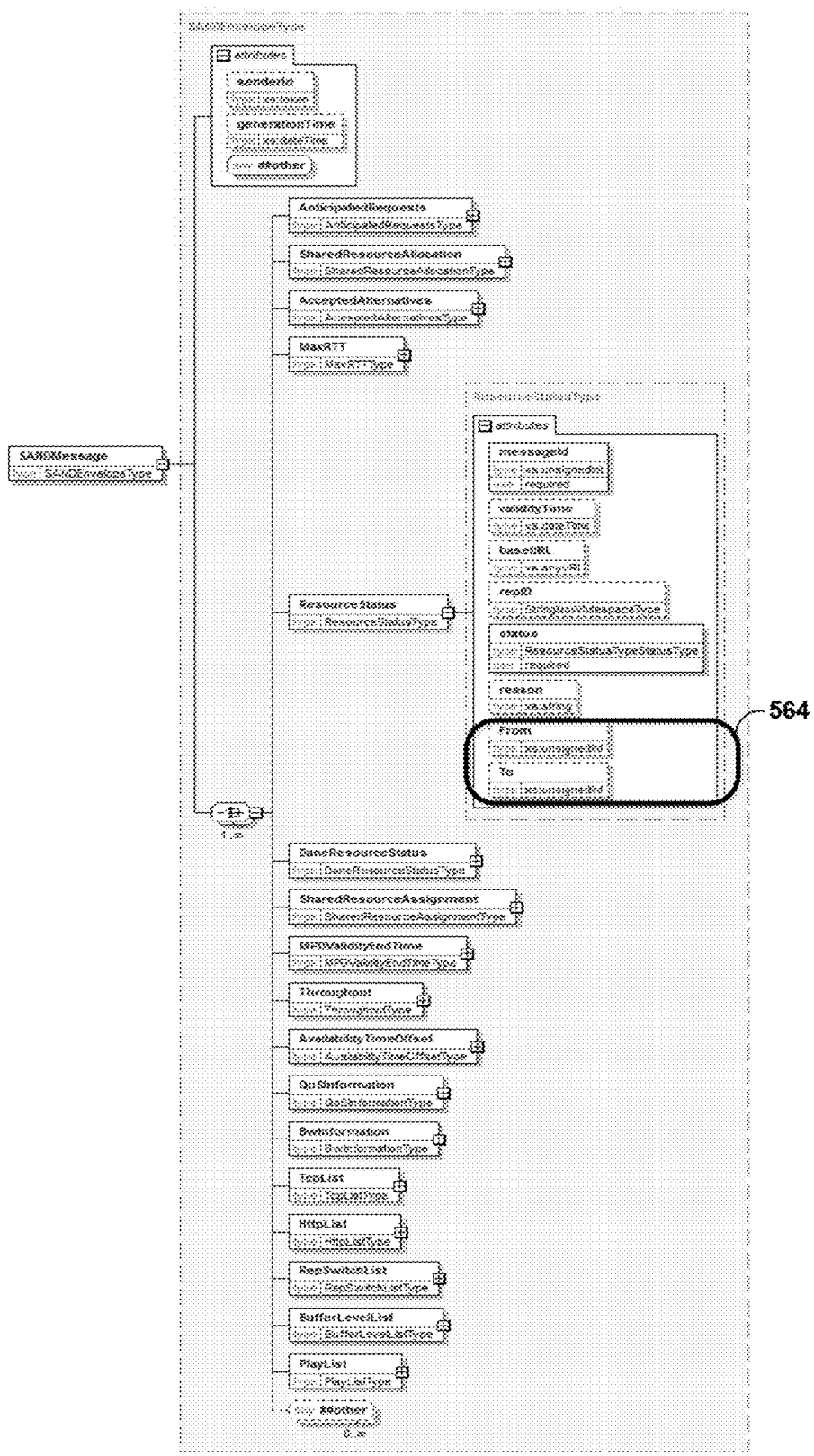
FIG. 25 is a conceptual diagram illustrating an example SAND message during a switch from unicast to broadcast according to the use case of FIGS. 23 and 24.

FIG. 25 is a conceptual diagram illustrating an example SAND message that may be used during a switch from a unicast service to a broadcast service according to the use case of FIGS. 23 and 24. In this example, the SAND message includes data 564 specifying a "From" attribute for the broadcast representation and a "To" attribute for the unicast representation. The following is an example:

```
<SANDMessage xmlns=..>
<ResourceStatus messageId="1" status="available" From=100
baseURL="http://www.example.com/V1"> </ResourceStatus>
<ResourceStatus messageId="1" status="available" To=100
baseURL="http://www.example.com/V2"> </ResourceStatus>
<ResourceStatus messageId="1" status="available" To=100
baseURL="http://www.example.com/V3"> </ResourceStatus>
<ResourceStatus messageId="1" status="available" From=100
baseURL="http://www.example.com/A1"> </ResourceStatus>
<ResourceStatus messageId="1" status="available" To=100
baseURL="http://www.example.com/A2"> </ResourceStatus>
<ResourceStatus messageId="1" status="available" To=100
baseURL="http://www.example.com/A3"> </ResourceStatus>
</SANDMessage>
```

Figure 26:
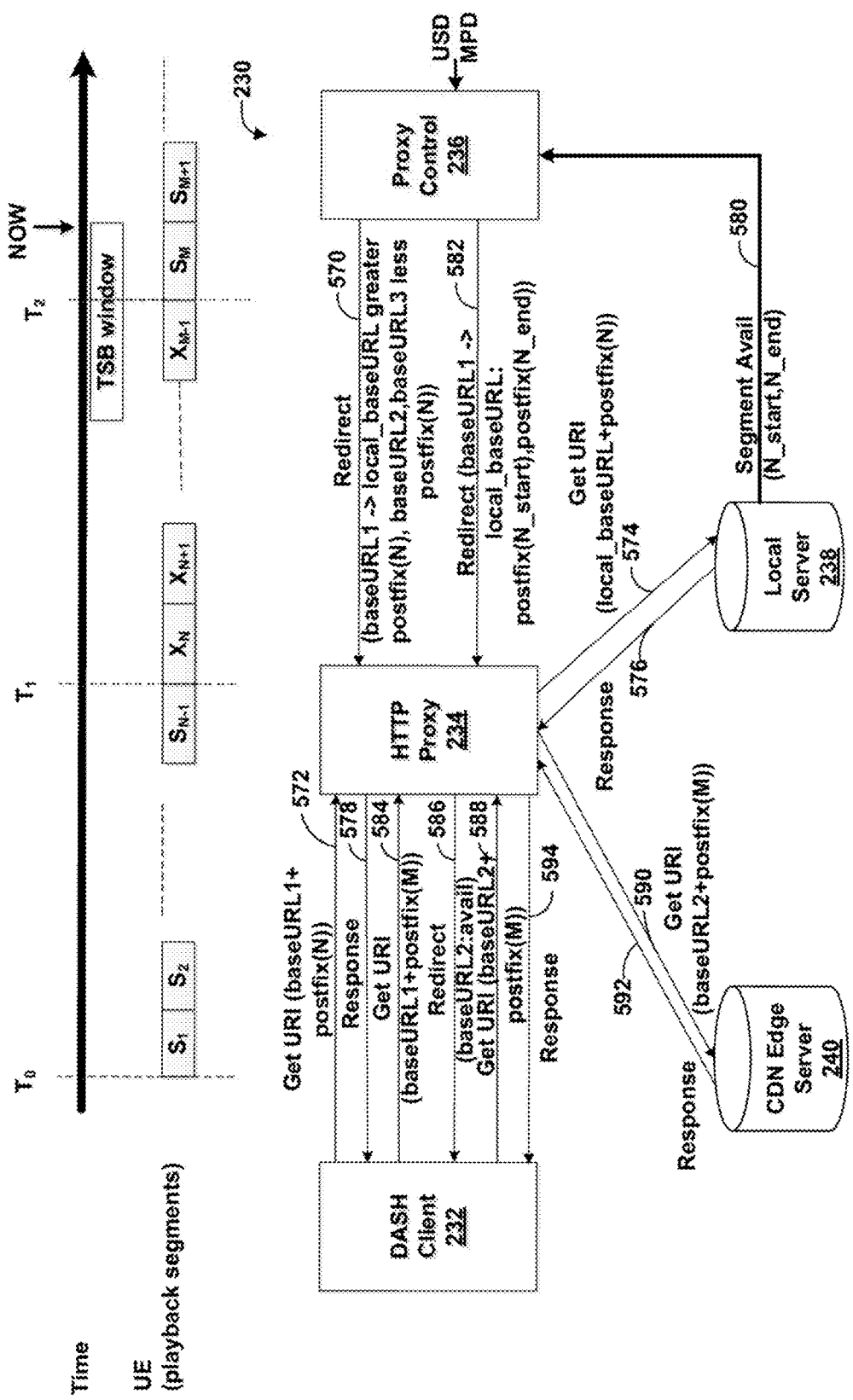
FIG. 26 is a conceptual diagram illustrating an example technique for configuring the HTTP proxy to direct the DASH client during a switch from broadcast to unicast in accordance with the use case of FIGS. 23-25.

FIG. 26 is a conceptual diagram illustrating an example technique for configuring HTTP proxy unit 234 to direct DASH client 232 during a switch from a broadcast service to a unicast service in accordance with the use case of FIGS. 23-25. The timeline for FIG. 26 may be the same as the timeline of FIG. 24, although the techniques of FIG. 26 are described as following those performed in the example of FIG. 24.

Proxy control unit 236 may configure HTTP proxy 234 to redirect requests for segments before segment N to a representation associated with the unicast service (e.g., Representation 2 or Representation 3), but segments including and following segment N to a representation associated with the broadcast service (e.g., Representation 1) (570). Thus, when DASH client 232 requests a segment from Representation 1 that is cached at local server 238 (572), HTTP proxy unit 234 may redirect the request to local server 238 (574). Local server 238 may respond by sending the segment to HTTP proxy unit 234 (576), which may forward the segment to DASH client 232 (578).

Local server 238 may also send data indicating which segments are locally cached to proxy control unit 236 (580). In this example, it is assumed that at time $T_2$, the broadcast service is no longer available. Accordingly, proxy control unit 236 configures HTTP proxy unit 234 to redirect requests for segments of Representation 1 that are available to local server 238, but to forward other requests to CDN edge server 240 (582). Thus, if DASH client 232 requests a segment of Representation 1 that is not available from local server 238 (584) (e.g., segments M and beyond), HTTP proxy unit 234 sends a SAND enforcement message indicating that this segment is not available, but a corresponding segment is available from a different representation (586).

Thus, DASH client 232 may request a segment subsequent to segment M from, e.g., Representation 2 (588), and HTTP proxy unit 234 may forward the request to CDN edge server 240 (590). CDN edge server may then respond by sending the requested segment to HTTP proxy unit 234 (592), which may forward the segment to DASH client 232 (594). At a time later than $T_2$, the user might go back to an earlier segment (e.g., segment $S_{M-2}$ of Representation 2) that is within the TSB window of segments received from Representation 1. In this case, unicast delivery can be used, but a similar segment $X_{M-2}$ of Representation 1 might already be cached. Thus, proxy control unit 236 may configure HTTP proxy unit 234 to direct requests for Representation 1 within the URL range of cached segments of local server 238 to local server 238. Likewise, a SAND assistance may be used to allow DASH client changing to cached broadcast segment (of Representation 1).

Figure 27:
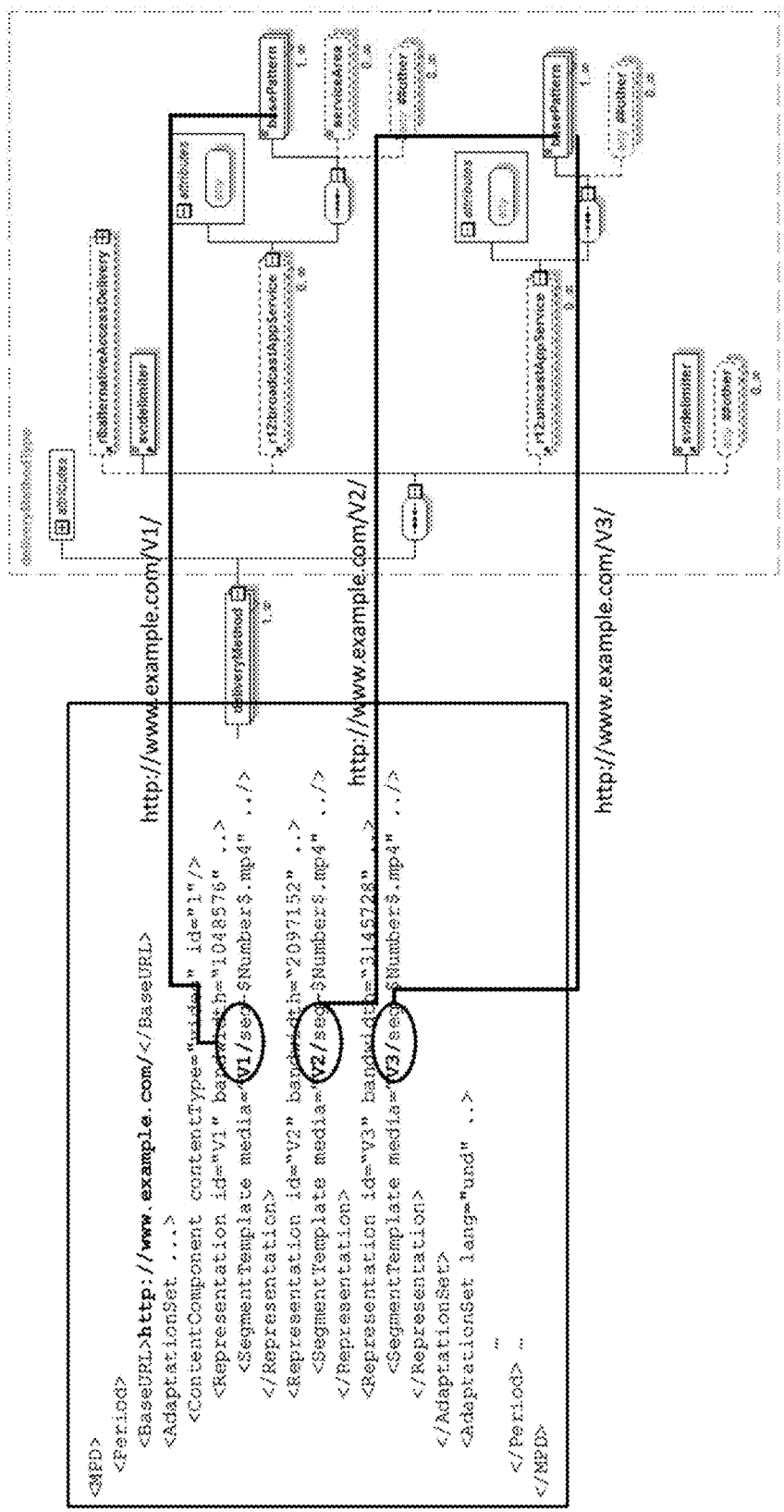
FIG. 27 is a conceptual diagram illustrating an example set of data of an MPD in accordance with techniques of this disclosure.

FIG. 27 is a conceptual diagram illustrating an example set of data of an MPD in accordance with techniques of this disclosure. This example represents another use case in accordance with the techniques of this disclosure. In this use case, the MPD contains multiple representations per media component, the broadcast representation is not available over unicast, MPD@timeShiftBufferDepth>>0 (large), and UE keeps moving in and out of broadcast coverage. The issue that arises is non-continuous sequence of cached segments in the local server.

In the example of FIG. 27, different types of video data (represented as "V1," "V2," and "V3") can be specified in either the basePattern element of the r12:unicastAppService of the deliveryMethodType element or the basePattern element of the r12:broadcastAppService of the deliveryMethodType element. In this example, "V1" is available via broadcast, and therefore, "V1" can be specified in the basePattern element of the r12:broadcastAppService. Likewise, in this example, "V2" and "V3" are available via unicast, and therefore, "V2" and "V3" can be specified in the basePattern element of the r12:unicastAppService.

Figure 28:
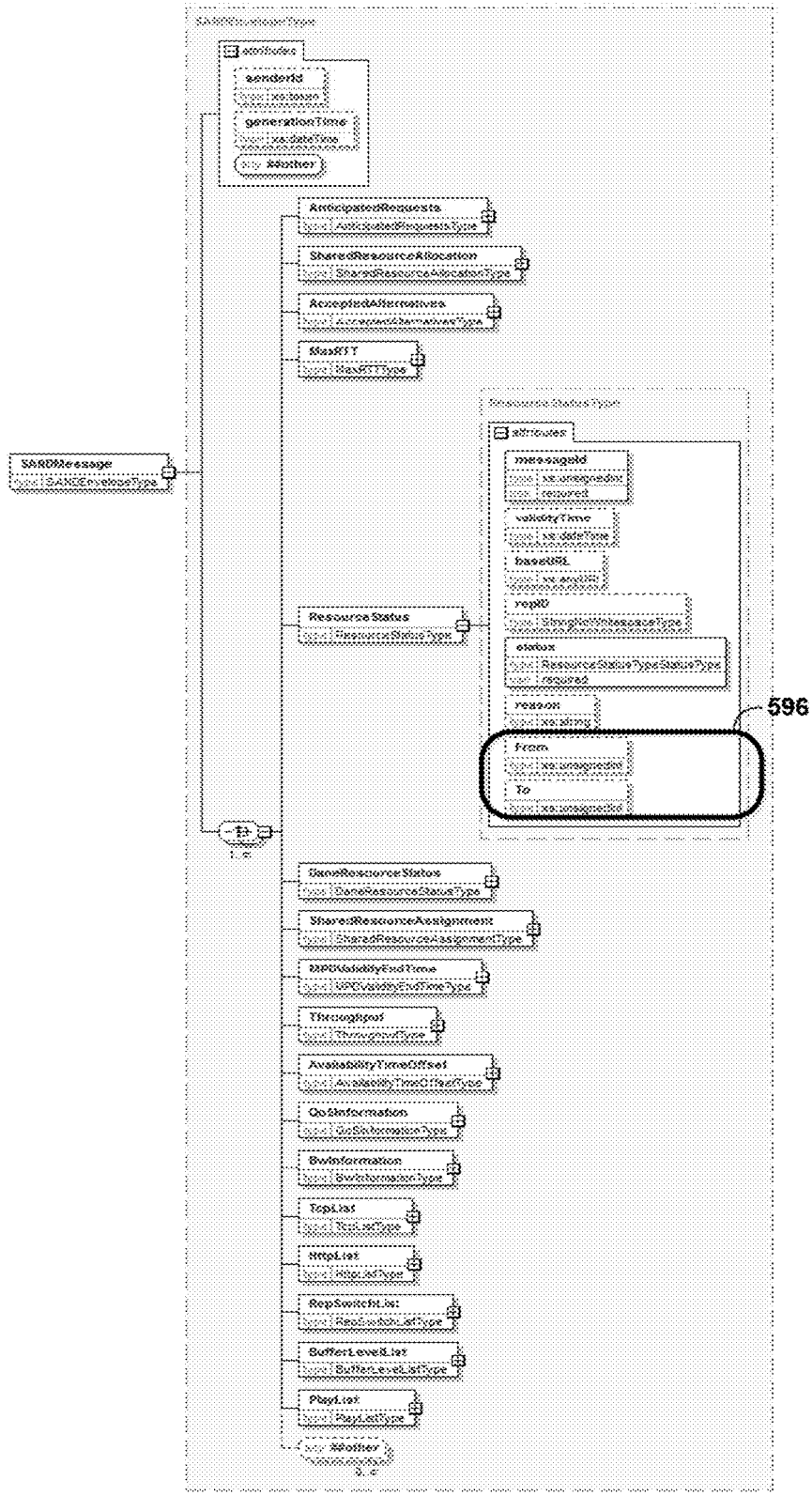
FIG. 28 is a conceptual diagram illustrating an example set of data that may be included in a SAND message for the use case of FIG. 27.

FIG. 28 is an example set of data 596 that may be included in a SAND message for the use case of FIG. 27. In particular, data 596 specifies a "from" attribute (indicating a start of available, cached segments of a local server) and a "to" attribute (indicating an end of available, cached segments of the local server). Multiple entries may be included in the SAND message for broadcast representations, e.g., as shown in the example below:

```
<SANDMessage xmlns=..>
<ResourceStatus messageId="1" status="cached" From=10 To=20
baseURL="http://www.example.com/V1"> </ResourceStatus>
<ResourceStatus messageId="1" status="available" From=30 To=40
baseURL="http://www.example.com/V1"> </ResourceStatus>
<ResourceStatus messageId="1" status="cached" From=50 To=60
baseURL="http://www.example.com/V1"> </ResourceStatus>
<ResourceStatus messageId="1" status="cached" From=10 To=20
baseURL="http://www.example.com/A1"> </ResourceStatus>
<ResourceStatus messageId="1" status="available" From=30 To=40
baseURL="http://www.example.com/A1"> </ResourceStatus>
<ResourceStatus messageId="1" status="cached" From=50 To=60
baseURL="http://www.example.com/A1"> </ResourceStatus>
</SANDMessage>
```

Figure 29:
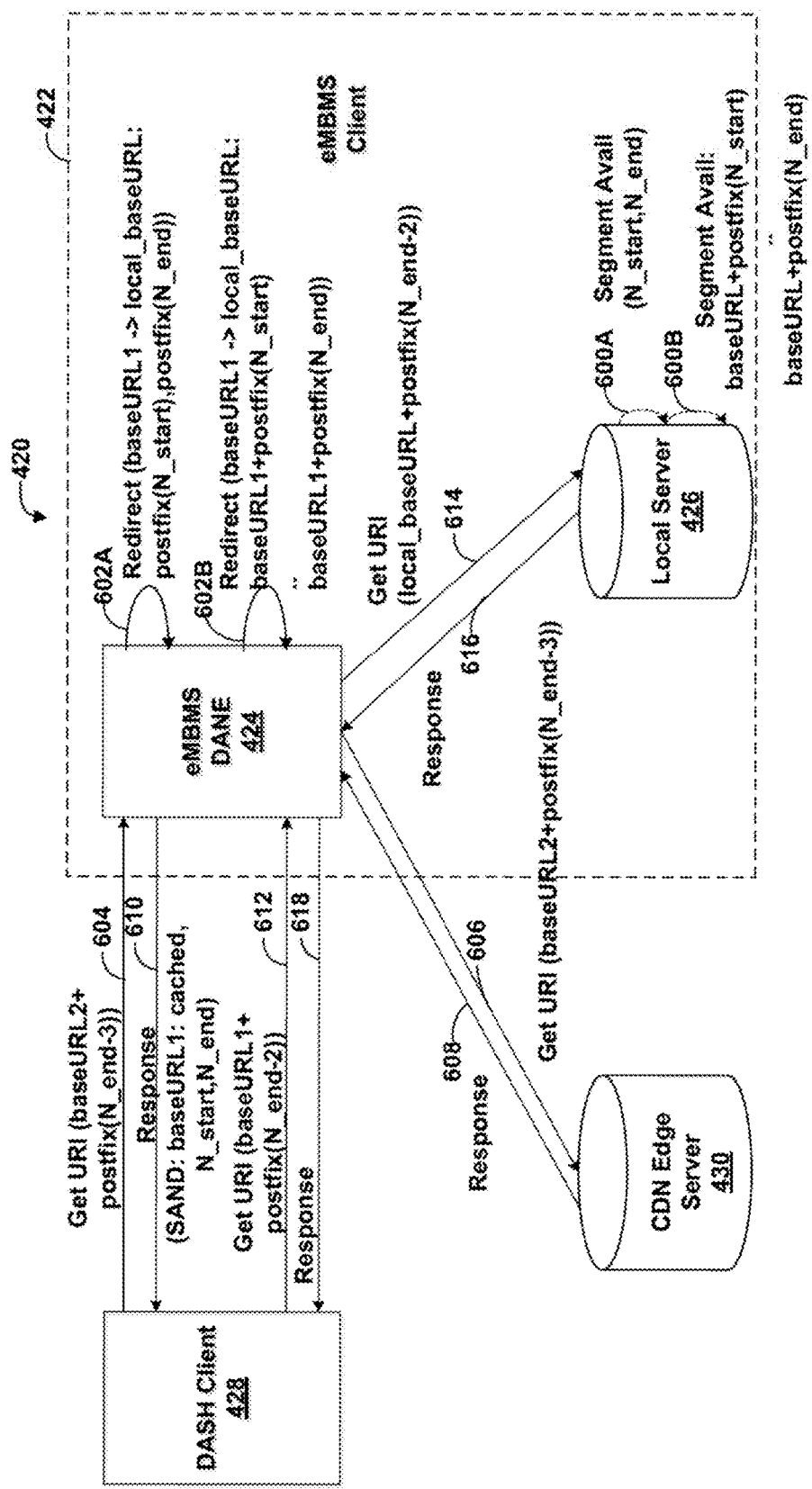
FIG. 29 is a conceptual diagram illustrating an example technique for using a DANE to assist a DASH client to use alternative local segments.

FIG. 29 is a conceptual diagram illustrating an example technique for using eMBMS DANE 424 to assist DASH client 428 to use alternative local segments, instead of retrieving similar segments from CDN edge server 430. Although not shown in FIG. 29, eMBMS middleware unit 422 may further include a proxy control unit, as shown in other examples above, and the proxy control unit may configure, e.g., eMBMS DANE 424 of eMBMS middleware unit 422. In accordance with one example:

The proxy control unit configures eMBMS DANE 424 to:
  Direct requests for segment URLs for Representation 1 with segment numbers between [N_start, N_end] to local server 426.
    N_start represents the segment number of the oldest segment cached in local server.
    N_end represents the segment number of the latest segment cached in local server.
  Provide a list of segment URLs that can be satisfied from local server 426.
  When local server 426 removes cached segments, the proxy control unit may update redirection rules of eMBMS DANE 424.

A SAND assistance message can be used to inform DASH client 428 that segments for Representation 1 from N_start to N_end are already cached at local server 426.

In particular, local server 426 may determine which segments are available initially (600A) and periodically as segments are removed from the cache (600B). Thus, eMBMS middleware unit 422 may configure eMBMS DANE 424 with redirection rules based on the available segments initially (602A) and in response to the updates from local server 426 (602B). In particular, eMBMS middleware unit 422 may configure eMBMS DANE 424 to redirect requests for segment numbers from a unicast representation to corresponding segments of a broadcast representation, if those segments are cached locally at local server 426.

Thus, if DASH client 428 requests a segment from a unicast representation that does not have a corresponding cached segment from a broadcast representation (604), eMBMS DANE 424 may forward the request to CDN edge server 430 (606). CDN edge server 430 may respond by sending the requested segment to eMBMS DANE 424 (608), which may forward the segment to DASH client 428 (610). On the other hand, if DASH client 428 requests a segment from the unicast representation that does have a corresponding cached segment from the broadcast representation (612), eMBMS DANE 424 may redirect the request to local server 426 to retrieve the corresponding segment of the broadcast representation (614). Local server 246 may then respond by sending the requested segment to eMBMS DANE 424 (616), which may forward the segment to DASH client 428 (618).

Moreover, in accordance with techniques of this disclosure, a parameter, such as a daneResourceStatus parameter, may be used to allow DANEs to signal available, and possibly anticipated to be available, data structures to the DASH client and also signal which data structures are unavailable. This method is complementary to the resource status mentioned above as it allows expression of the available segments at the time of the status message. The resources may be explicitly listed or provided as a list, or they may be provided by some abbreviated message format. Typical use cases may be as follows:

the DANE may join an upstream multicast/broadcast service that delivers segments close to segment availability time. This means that Segments are available only from a specific time onwards in the cache.

certain segments are lost and this is detected by the DANE to be lost and unavailable.

In order to address this, an extension of the existing SAND messages is considered. Some more details are discussed in the following.

Source and destination data may be signaled as follows:
Type: PER
Sender: caching DANE
Receiver: DASH client (and intermediate DANEs)

Data representation, which may be in the format of a table. The table may be in accordance with the table below:

| Name | Type | Cardinality | Description |
|---|---|---|---|
| DaneResourceStatus | | | Provides the status of the resources listed below. |
| @messageId | xs:unsignedInt | M | allow receivers of SAND messages to discriminate between |

-continued

| Name | Type | Cardinality | Description |
|---|---|---|---|
| @status | xs:string | M | several messages sent from the same sender specifies the resources that can be assigned to this type. The define types are documented in table X. |
| @validity | xs:duration | OD default = 0 | Specifies the validity of the message from the time it was requested or when available, when it was generated according t |
| Resource | xs:anyURI | 0 ... N | Provides a resource for which the status applies |
| ResourceGroup | xs:string | 0 ... N | Provides a group of resources for which the status applies. For more details see section 4.2.1.4 |

Status indicator (according to @status), and semantics for the status indicators, may be as follows:

| Status | Semantics |
|---|---|
| cached | Resource is available in DANE |
| unavailable | Resource is not available in the DANE and request will result in 404 |
| unknown | Resource is not available in the DANE and request will be forwarded to origin server |
| promised | Resource will be available in the DANE at the time announced in the Media Presentation |

The resource group element of the table above may define a string with multiple segments. In order to express different types use cases and to compress the message size, some simplified regular expression patterns are permitted. The resource group does not indicate that for all resources that can be generated by this pattern, the status applies, but only for the intersection of resources that are referenced in the Media Presentation and the ones that are generated by the expression pattern The regular expression pattern may follow the POSIX standard (Portable Operating System Interface). As an overview, the following meta characters may be used to express a group of resources:

| Meta Character | Description |
|---|---|
| . | Matches any single character (many applications exclude newlines, and exactly which characters are considered newlines is flavor-, character-encoding-, and platform-specific, but it is safe to assume that the line feed character is included). Within POSIX bracket expressions, the dot character matches a literal dot. For example, a.c matches "abc", etc., but [a c] matches only "a", ".", or "c". |
| [ ] | A bracket expression. Matches a single character that is contained within the brackets. For example, [abc] matches "a", "b", or "c". [a-z] specifies a range which matches any lowercase letter from "a" to "z". These forms can be mixed: [abcx-z] matches "a", "b", "c", "x", "y", or "z", as does [a-cx-z] The - character is treated as a literal character if it is the last or the first (after the /\ if present) character within the brackets: [abc-], [-abc]. Note that backslash escapes are not allowed. The ] character can be included in a bracket expression if it is the first (after the /\) character: []abc] |
| [/\] | Matches a single character that is not contained within the brackets. For example, [/\abc] matches any character other than "a", "b", or "c". [/\a-z] matches any single character that is not a lowercase letter from "a" to "z". Likewise, literal characters and ranges can be mixed. |
| /\ | Matches the starting position within the string. In line-based tools, it matches the starting position of any line. |
| $ | Matches the ending position of the string or the position just before a string-ending newline. In line-based tools, it matches the ending position of any line. |
| ( ) | Defines a marked subexpression. The string matched within the parentheses can be recalled later (see the next entry, \n). A marked subexpression is also called a block or capturing group. BRE mode requires \( \). |
| \n | Matches what the nth marked subexpression matched, where n is a digit from 1 to 9. This construct is vaguely defined in the POSIX.2 standard. Some tools allow referencing more than nine capturing groups. |
| * | Matches the preceding element zero or more times. For example, ab*c matches "ac", "abc", "abbbc", etc. [xyz]* matches " ", "x", "y", "z", "zx", "zyx", "xyzzy", and so on. (ab)* matches " ", "ab", "abab", "ababab", and so on. |
| {m,n} | Matches the preceding element at least m and not more than n times. For example, a{3,5} matches only "aaa", "aaaa", and "aaaaa". This is not found in a few older instances of regular expressions. BRE mode requires \{m,n\}. |

Sender-side logic may be according to the pseudocode below:

```
// DANE behavior
// First example: generate cached Resources
{
    result = [ ]
    set status to cached
    for all objects in the cache
        add a line Resource with the URL to this object to the message
}
```

Figure 30:
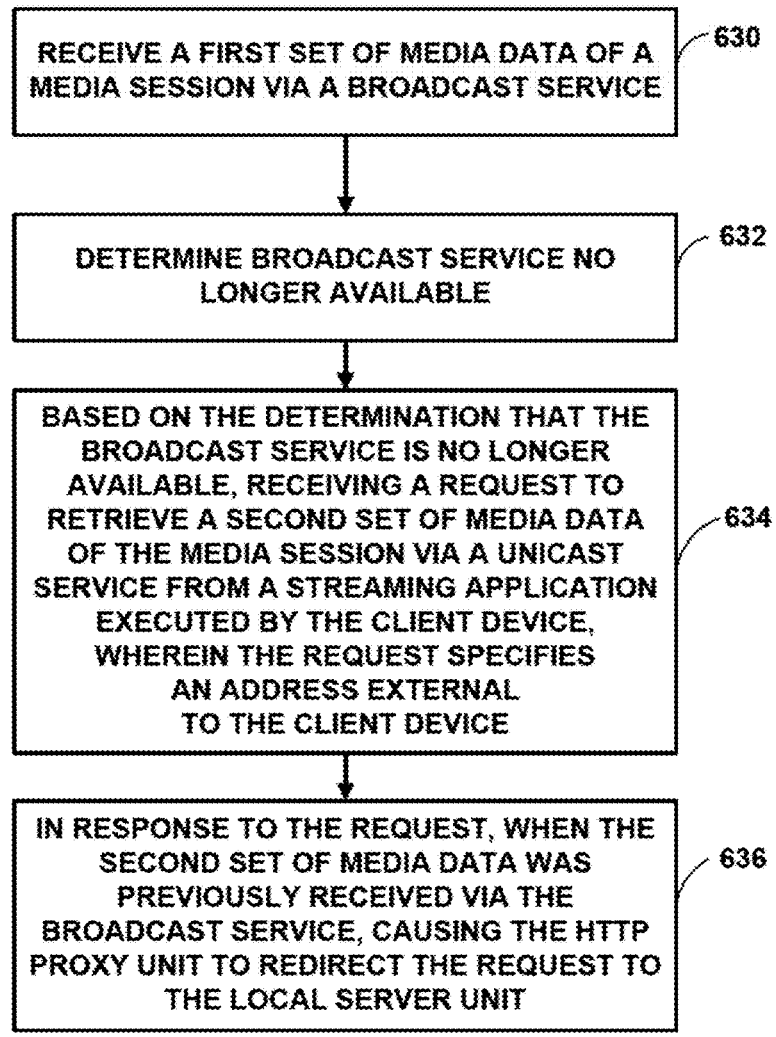
FIG. 30 is a flowchart illustrating an example method in accordance with the techniques of this disclosure.

FIG. 30 is a flowchart illustrating an example method in accordance with the techniques of this disclosure. The method of FIG. 30 may be performed by a middleware unit of a client device that controls an HTTP proxy unit of the client device. For example, the method of FIG. 30 may be performed by eMBMS middleware unit 100 of FIG. 2, eMBMS middleware unit 188 of FIG. 6, proxy control unit 236 of, e.g., FIG. 9, or middleware unit 422 of, e.g., FIG. 18. For purposes of example and explanation, the method of FIG. 30 is explained as being performed by middleware unit 100 of FIG. 2. As shown in FIG. 2, middleware unit 100 includes HTTP proxy unit 108 and local server unit 102.

Initially, middleware unit 100 receives a first set of media data of a media session via a broadcast service (630). Middleware unit 100 may later (i.e., after receiving the first set of media data) determine that the broadcast service is no longer available (632). Based on the determination that the broadcast service is no longer available, middleware unit 100 may receive a request to retrieve a second set of media data of the media session via a unicast service from a streaming application (e.g., DASH client 110) executed by the client device, where the request specifies an address external to the client device (634). The second set of media data may be included within the first set of media data that was previously received via the broadcast service. Thus, in response to the request, when the second set of media data was previously received via the broadcast service, middleware unit 100 may cause an HTTP proxy unit (e.g., HTTP proxy unit 108 of FIG. 2) to redirect the request to a local server unit (636), e.g., local server unit 102 (FIG. 2).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data by a middleware unit at a client device, wherein the middleware unit controls a hypertext transfer protocol (HTTP) proxy unit of the client device, and wherein the client device includes a local server unit, the method comprising, by the middleware unit:
   receiving a first set of media data of a media session via a broadcast service;
   determining that the broadcast service is no longer available after receiving the first set of media data;
   receiving a request to retrieve a second set of media data of the media session via a unicast service from a streaming application executed by the client device based on the determination that the broadcast service is no longer available, wherein the request specifies an address external to the client device; and
   in response to the request, when the second set of media data was previously received via the broadcast service, causing the HTTP proxy unit to redirect the request to the local server unit instead of the address external to the client device, wherein the second set of media data was previously received via the broadcast service.

2. The method of claim 1, wherein receiving the request from the streaming application comprises intercepting the request from the streaming application.

3. The method of claim 1, wherein causing the HTTP proxy unit to redirect comprises causing the HTTP proxy unit to send an HTTP 300 response to the streaming client that includes a localhost address associated with the local server unit.

4. The method of claim 1, further comprising configuring an interface of the streaming application to the middleware unit with proxy information for the HTTP proxy unit.

5. The method of claim 1, wherein a manifest file for the media session indicates that there are multiple representations for the media data, wherein the unicast service provides data of a first representation of the multiple representations, and wherein the broadcast service provides data of a second, different representation of the multiple representations, the method further comprising:
when the broadcast service is available, using a first Server and Network assisted DASH (SAND) enforcement message to cause the streaming client to retrieve data from the second representation; and
when the broadcast service is not available, using a second SAND enforcement message to cause the streaming client to retrieve data from the first representation.

6. The method of claim 5, wherein the first SAND enforcement message and the second SAND enforcement message conform to a SAND enforcement message schema that includes:
a base uniform resource locator (URL) field that represents a uniform resource identifier (URI) prefix that identifies a representation in a corresponding manifest file; and
a status field that represents statuses of all associated resources.

7. The method of claim 5, wherein causing the HTTP proxy unit to redirect comprises causing the HTTP proxy unit to include an identifier of the second representation in an HTTP 300 response to the streaming client.

8. The method of claim 1, further comprising:
prior to a switch from the unicast service to the broadcast service, retrieving a third set of media data of the media session using the unicast service in response to requests from the streaming client for the third set of media data;
after the switch from the unicast service to the broadcast service, receiving a fourth set of media data of the media session via the broadcast service.

9. The method of claim 1, further comprising, when the second set of media data was not previously received via the broadcast service, redirecting the request for the second set of media data to a server device separate from the client device.

10. The method of claim 1, further comprising configuring the HTTP proxy unit to:
direct requests for segments cached in the local server unit to the local server unit; and
provide a list of segment identifiers that can be satisfied by the local server unit to the streaming application.

11. The method of claim 1, further comprising causing data to be sent to the streaming client, the data including one or more identifiers of media data cached by the local server unit.

12. The method of claim 11, wherein the data conforms to a SAND message.

13. The method of claim 11, wherein the data includes a list of comma separated values representing the identifiers, and wherein the identifiers specify a start of available media data and an end of the available media data.

14. The method of claim 11, wherein the data includes a from-field and a to-field, wherein the from-field specifies a start of available media data and the to-field specifies an end of the available media data.

15. The method of claim 11, wherein the data comprises one or more regular expressions.

16. The method of claim 11, wherein the data comprises a list of statuses for sets of media data.

17. The method of claim 1, wherein the media data comprises a plurality of segments, each of the segments being associated with a distinct uniform resource locator (URL).

18. The method of claim 1, wherein the manifest file comprises a media presentation description (MPD).

19. The method of claim 1, wherein the streaming client comprises a dynamic adaptive streaming over HTTP (DASH) client.

20. A device for retrieving media data, the device comprising:
a hypertext transfer protocol (HTTP) proxy unit;
a local server unit; and
a middleware unit that controls the HTTP proxy unit, wherein the middleware unit is implemented by a hardware-based processing unit comprising logic circuitry, and wherein the middleware unit is configured to:
receive a first set of media data of a media session via a broadcast service;
determine that the broadcast service is no longer available after receiving the first set of media data;
receive a request to retrieve a second set of media data of the media session via a unicast service from a streaming application executed by the client device based on the determination that the broadcast service is no longer available, wherein the request specifies an address external to the client device; and
in response to the request, when the second set of media data was previously received via the broadcast service, cause the HTTP proxy unit to redirect the request to the local server unit instead of the address external to the client device, wherein the second set of media data was previously received via the broadcast service.

21. The device of claim 20, wherein a manifest file for the media session indicates that there are multiple representations for the media data, wherein the unicast service provides data of a first representation of the multiple representations, and wherein the broadcast service provides data of a second, different representation of the multiple representations, and wherein the middleware unit is further configured to:
when the broadcast service is available, use a first Server and Network assisted DASH (SAND) enforcement message to cause the streaming client to retrieve data from the second representation; and
when the broadcast service is not available, use a second SAND enforcement message to cause the streaming client to retrieve data from the first representation.

22. The device of claim 21, wherein the first SAND enforcement message and the second SAND enforcement message conform to a SAND enforcement message schema that includes:
  a base uniform resource locator (URL) field that represents a uniform resource identifier (URI) prefix that identifies a representation in a corresponding manifest file; and
  a status field that represents statuses of all associated resources.

23. The device of claim 20, wherein the middleware unit is further configured to configure the HTTP proxy unit to:
  direct requests for segments cached in the local server unit to the local server unit; and
  provide a list of segment identifiers that can be satisfied by the local server unit to the streaming application.

24. The device of claim 20, wherein the middleware unit is further configured to cause data to be sent to the streaming client, the data including one or more identifiers of media data cached by the local server unit.

25. The device of claim 24, wherein the data includes a list of comma separated values representing the identifiers, wherein the identifiers specify a start of available media data and an end of the available media data, wherein the data includes a from-field and a to-field, wherein the from-field specifies a start of available media data and the to-field specifies an end of the available media data, wherein the data comprises one or more regular expressions, and wherein the data comprises a list of statuses for sets of media data.

26. The device of claim 20, wherein the HTTP proxy unit is included in the middleware unit.

27. The device of claim 20, wherein the HTTP proxy unit is separate from the middleware unit.

28. A device for retrieving media data, the device comprising:
  a hypertext transfer protocol (HTTP) proxy unit;
  a local server unit;
  middleware means for receiving a first set of media data of a media session via a broadcast service;
  middleware means for determining that the broadcast service is no longer available after receiving the first set of media data;
  middleware means for receiving a request to retrieve a second set of media data of the media session via a unicast service from a streaming application executed by the client device based on the determination that the broadcast service is no longer available, wherein the request specifies an address external to the client device; and
  middleware means for causing, in response to the request, when the second set of media data was previously received via the broadcast service, the HTTP proxy unit to redirect the request to the local server unit instead of the address external to the client device, wherein the second set of media data was previously received via the broadcast service.

29. The device of claim 28, wherein a manifest file for the media session indicates that there are multiple representations for the media data, wherein the unicast service provides data of a first representation of the multiple representations, and wherein the broadcast service provides data of a second, different representation of the multiple representations, further comprising:
  means for using, when the broadcast service is available, a first Server and Network assisted DASH (SAND) enforcement message to cause the streaming client to retrieve data from the second representation; and
  means for using, when the broadcast service is not available, a second SAND enforcement message to cause the streaming client to retrieve data from the first representation.

30. The device of claim 29, wherein the first SAND enforcement message and the second SAND enforcement message conform to a SAND enforcement message schema that includes:
  a base uniform resource locator (URL) field that represents a uniform resource identifier (URI) prefix that identifies a representation in a corresponding manifest file; and
  a status field that represents statuses of all associated resources.

31. The device of claim 28, further comprising means for configuring the HTTP proxy unit to:
  direct requests for segments cached in the local server unit to the local server unit; and
  provide a list of segment identifiers that can be satisfied by the local server unit to the streaming application.

32. The device of claim 28, further comprising means for causing data to be sent to the streaming client, the data including one or more identifiers of media data cached by the local server unit.

33. The device of claim 32, wherein the data includes a list of comma separated values representing the identifiers, wherein the identifiers specify a start of available media data and an end of the available media data, wherein the data includes a from-field and a to-field, wherein the from-field specifies a start of available media data and the to-field specifies an end of the available media data, wherein the data comprises one or more regular expressions, and wherein the data comprises a list of statuses for sets of media data.

34. A non-transitory computer-readable storage medium having stored thereon instructions that, when executed, cause a processor comprising a middleware unit at a client device, wherein the middleware unit controls a hypertext transfer protocol (HTTP) proxy unit of the client device, and wherein the client device includes a local server unit, to:
  receive a first set of media data of a media session via a broadcast service;
  determine that the broadcast service is no longer available after receiving the first set of media data;
  receive a request to retrieve a second set of media data of the media session via a unicast service from a streaming application executed by the client device based on the determination that the broadcast service is no longer available, wherein the request specifies an address external to the client device; and
  in response to the request, when the second set of media data was previously received via the broadcast service, cause the HTTP proxy unit to redirect the request to the local server unit instead of the address external to the client device, wherein the second set of media data was previously received via the broadcast service.

35. The non-transitory computer-readable storage medium of claim 34, wherein a manifest file for the media session indicates that there are multiple representations for the media data, wherein the unicast service provides data of a first representation of the multiple representations, and wherein the broadcast service provides data of a second, different representation of the multiple representations, further comprising instructions that cause the processor to:
  when the broadcast service is available, use a first Server and Network assisted DASH (SAND) enforcement message to cause the streaming client to retrieve data from the second representation; and when the broadcast service is not available, use a second SAND enforcement message to cause the streaming client to retrieve data from the first representation.

36. The non-transitory computer-readable storage medium of claim 35, wherein the first SAND enforcement message and the second SAND enforcement message conform to a SAND enforcement message schema that includes:
a base uniform resource locator (URL) field that represents a uniform resource identifier (URI) prefix that identifies a representation in a corresponding manifest file; and
a status field that represents statuses of all associated resources.

37. The non-transitory computer-readable storage medium of claim 34, further comprising instructions that cause the processor to configure the HTTP proxy unit to:
direct requests for segments cached in the local server unit to the local server unit; and
provide a list of segment identifiers that can be satisfied by the local server unit to the streaming application.

38. The non-transitory computer-readable storage medium of claim 34, further comprising instructions that cause the processor to cause data to be sent to the streaming client, the data including one or more identifiers of media data cached by the local server unit.

39. The non-transitory computer-readable storage medium of claim 38, wherein the data includes a list of comma separated values representing the identifiers, wherein the identifiers specify a start of available media data and an end of the available media data, wherein the data includes a from-field and a to-field, wherein the from-field specifies a start of available media data and the to-field specifies an end of the available media data, wherein the data comprises one or more regular expressions, and wherein the data comprises a list of statuses for sets of media data.

* * * * *